US012738213B2

(12) United States Patent
Kim

(10) Patent No.: US 12,738,213 B2
(45) Date of Patent: Sep. 15, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventor: Chul Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 39 days.

(21) Appl. No.: 18/944,858

(22) Filed: Nov. 12, 2024

(65) Prior Publication Data

US 2025/0191533 A1 Jun. 12, 2025

(30) Foreign Application Priority Data

Dec. 7, 2023 (KR) ........................ 10-2023-0177122

(51) Int. Cl.
*G09G 3/3225* (2016.01)
*G06V 40/13* (2022.01)

(52) U.S. Cl.
CPC ....... *G09G 3/3225* (2013.01); *G06V 40/1324* (2022.01); *G09G 2354/00* (2013.01); *G09G 2360/141* (2013.01)

(58) Field of Classification Search
None
See application file for complete search history.

(56) References Cited

U.S. PATENT DOCUMENTS

| | | | |
|---|---|---|---|
| 10,398,324 B2 | 9/2019 | Mukkamala et al. | |
| 11,158,258 B2 | 10/2021 | Cha et al. | |
| 2018/0078151 A1* | 3/2018 | Allec | A61B 5/6801 |
| 2019/0065717 A1* | 2/2019 | Won | G06V 40/1365 |
| 2023/0225624 A1 | 7/2023 | Sola I Caros et al. | |

FOREIGN PATENT DOCUMENTS

KR 10-2021-0064483 A 6/2021

* cited by examiner

*Primary Examiner* — Nicholas J Lee
(74) *Attorney, Agent, or Firm* — F. Chau & Associates, LLC

(57) ABSTRACT

A display device includes a display panel and a readout circuit. The display panel includes light emitting pixels and light sensing pixels. Each of the light emitting pixels includes a light emitting element, and each of the light sensing pixels includes a photoelectric conversion element. The readout circuit is connected to the light sensing pixels through readout lines. When operating in a photoplethysmography (PPG) sensing mode, the readout circuit may receive first sensing current from one or more of the light sensing pixels in a first sensing area adjacent to a sensing light emitting area that emits light, may receive second sensing current from one or more the light sensing pixels in a second sensing area spaced from the first sensing area, and may generate a PPG signal based on the first sensing current and the second sensing current.

26 Claims, 16 Drawing Sheets

10
400
MAIN PROCESSOR
IDAT
CTRL
SMODE
240
DISPLAY CONTROLLER
EMCTRL
ODAT
DCTRL
SCTRL
DATA DRIVER
230
DS
DL
DA
100
PX
PS
210
SCAN DRIVER
SS
GW[n]
GC[n]
GI[n]
GB[n]
DISPLAY PANEL
EM[n]
EMISSION DRIVER
220
PPG
GR
VRST
RL
SMODE
READOUT CIRCUIT
300

PS
RL
T11
GW[n]
VSENREF
T9
VRST
T10
GR
PD
PX
GB[n]
VOBS
T8
EM[n]
ELVSS
ELVDD
T5
T1
T6
EL
T7
AINT
T3
GC[n]
CST
T4
VINT
T2
GW[n]
DL
GI[n]

(a)
(b)
(c)
(d)
(e)
(f)
SA2
SA1
SLA
OA 11
100
302
SS3(PPG)
NOISE ELIMINATOR
341
NS
SS1
BAND REJECTION FILTER
360
SS2
SENSING CIRCUIT
331
SC1-2
SC1-1
RL1-2
RL1-1
SA1-2
SA1-1
SLA
PS
PS
320
GLOBAL RESET CIRCUIT
310
REGISTER
GR
VRST
POWER MANAGEMENT CIRCUIT
500
SMODE 12
100
SA1-2
SA1-1
SLA
PS
PS
RL1-2
RL1-1
SC1-2
SC1-1
VRST
GR
SS5(PPG)
301
OPERATIONAL AMPLIFIER
380
SS3
SS4
NOISE ELIMINATOR
341
NS
360
370
SS1
BAND REJECTION FILTER
BAND PASS FILTER
SS2
SS2
SENSING CIRCUIT
331
320
310
GLOBAL RESET CIRCUIT
REGISTER
SMODE
POWER MANAGEMENT CIRCUIT
500

FIG. 12

100
OA
PU4
FGR
SA2
SLA
PU2-2
SA1-2
SA2
PU3
PU3
PU2-1
SA1-1
PU1

14
100
SA1-1
SLA
PS
SA1-2
RL1-1
RL1-2
SA2
RL2
VRST
GR
SC2
SC1-1
SC1-2
POWER MANAGEMENT CIRCUIT
500
GLOBAL RESET CIRCUIT
320
SENSING CIRCUIT
332
SS1
NS1
LOW PASS FILTER
350
NS2
NOISE ELIMINATOR
342
SS3
SS4
OPERATIONAL AMPLIFIER
380
SS5(PPG)
SMODE
REGISTER
310
SS2
BAND REJECTION FILTER
360
NS3
BAND PASS FILTER
370
304

DISPLAY DEVICE AND ELECTRONIC DEVICE INCLUDING THE SAME

CROSS-REFERENCE TO RELATED APPLICATION(S)

This application claims priority to Korean Patent Application No. 10-2023-0177122, filed on Dec. 7, 2023, and all the benefits accruing therefrom under 35 U.S.C. § 119, which is hereby incorporated by reference for all purposes as if fully set forth herein.

BACKGROUND

1. Field

One or more embodiments described herein relate to a display device and an electronic device.

2. Description of the Related Art

Electronic devices (e.g., a smart phone, a smart watch, etc.) have been developed that perform a bio-sensing operation. Examples of the bio-sensing operation include a fingerprint sensing operation and a photoplethysmography (PPG) sensing operation. The electronic devices may perform the bio-sensing operation using a sensor that is separate from a display device. In this case, the size of a display region of the electronic device or the display device may be reduced, and additionally the size of a bezel may increase. In an attempt to solve this problem, an in-cell light sensor technique has been developed. The in-cell sensor technique employs an optical sensor or a light sensing pixel within the display region of the display device.

SUMMARY

One or more embodiments described herein provide a display device with improved sensing accuracy. These embodiments may be applied during detection of a biological signal of a user, such as, but not limited to, a photoplethysmography (PPG) signal.

One or more embodiments described herein also provide an electronic device including the display device.

Additional features of the inventive concepts will be set forth in the description which follows, and in part will be apparent from the description, or may be learned by practice of the inventive concepts.

A display device according to an embodiment may include a display panel including light emitting pixels and light sensing pixels. Each of the light emitting pixels includes a light emitting element, and each of the light sensing pixels includes a photoelectric conversion element. The display device may also include a readout circuit connected to the light sensing pixels through readout lines. When operating in a photoplethysmography (PPG) sensing mode, the readout circuit may receive first sensing current from one or more of the light sensing pixels in a first sensing area adjacent to a sensing light emitting area that emits light, may receive second sensing current from one or more of the light sensing pixels in at least one second sensing area spaced from the first sensing area, and may generate a PPG signal based on the first sensing current and the second sensing current.

In an embodiment, the at least one second sensing area may be spaced apart from the sensing light emitting area. Reflected light, which is emitted from the sensing light emitting area and reflected from a blood vessel of a finger of a user, may be incident on the first sensing area. The reflected light may not be incident on the second sensing area.

In an embodiment, the at least one second sensing area may be positioned at one side of the sensing light emitting area.

In an embodiment, the display device may include a plurality of second sensing areas. The plurality of second sensing areas may be positioned at different sides of the sensing light emitting area, respectively.

In an embodiment, a size of the second sensing area may be greater than a size of the first sensing area.

In an embodiment, the sensing light emitting area may surround at least a portion of the first sensing area in a plan view.

In an embodiment, a distance between the sensing light emitting area and the one or more second sensing areas may be greater than or equal to a width of the sensing light emitting area.

In an embodiment, the readout circuit may include a sensing circuit receiving the first sensing current and the second sensing current through the readout lines, generating a first sensing signal corresponding to the first sensing current, and generating a first noise signal corresponding to the second sensing current, a low pass filter receiving the first noise signal from the sensing circuit and generating a second noise signal, and a noise eliminator receiving the first sensing signal from the sensing circuit, receiving the second noise signal from the low pass filter, and generating a second sensing signal based on the first sensing signal and the second noise signal.

In an embodiment, the first sensing area may include a first-first sensing area and a first-second sensing area spaced apart from each other, and the reflected light is incident each of the first-first sensing area and the first-second sensing area. The readout circuit may receive first-first sensing currents from the light sensing pixels in the first-first sensing area, may receive first-second sensing currents from the light sensing pixels in the first-second sensing area, and may generate the PPG signal based on the first-first sensing currents, the first-second sensing currents, and the second sensing currents.

In an embodiment, the readout circuit may include a sensing circuit receiving the first-first sensing currents, the first-second sensing currents, and the second sensing currents through the readout lines, generating a first sensing signal corresponding to the first-first sensing currents, generating a second sensing signal corresponding to the first-second sensing currents, and generating a first noise signal corresponding to the second sensing currents, a low pass filter receiving the first noise signal from the sensing circuit and generating a second noise signal, a band rejection filter receiving the second sensing signal from the sensing circuit and generating a third noise signal, and a noise eliminator receiving the first sensing signal from the sensing circuit, receiving the second noise signal from the low pass filter, receiving the third noise signal from the band rejection filter, and generating a third sensing signal based on the first sensing signal, the second noise signal, and the third noise signal.

In an embodiment, the readout circuit may further include a band pass filter receiving the second sensing signal from the sensing circuit and generating a fourth sensing signal, and an operational amplifier receiving the third sensing signal from the noise eliminator, receiving the fourth sensing signal from the band pass filter, and generating a fifth sensing signal based on the third sensing signal and the fourth sensing signal.

In an embodiment, the second sensing area may be adjacent to the sensing light emitting area. Reflected light, which is emitted from the sensing light emitting area and reflected from a blood vessel of a finger of a user, may be incident on each of the first sensing area and the second sensing area.

In an embodiment, the readout circuit may include a sensing circuit receiving the first sensing current and the second sensing current through the readout lines, generating a first sensing signal corresponding to the first sensing current, and generating a first noise signal corresponding to the second sensing current, a band rejection filter receiving the second sensing signal from the sensing circuit and generating a noise signal, and a noise eliminator receiving the first sensing signal from the sensing circuit, receiving the noise signal from the band rejection filter, and generating a third sensing signal based on the first sensing signal and the noise signal.

In an embodiment, the readout circuit may include a band pass filter receiving the second sensing signal from the sensing circuit and generating a fourth sensing signal, and an operational amplifier receiving the third sensing signal from the noise eliminator, receiving the fourth sensing signal from the band pass filter, and generating a fifth sensing signal based on the third sensing signal and the fourth sensing signal.

In an embodiment, in the PPG sensing mode, in the sensing light emitting area, the light emitting pixels are turned on and the light sensing pixels may be turned off. In the PPG sensing mode, in the first sensing area, the light emitting pixels are turned off and the light sensing pixels may be turned on. In the PPG sensing mode, in the second sensing area, the light emitting pixels are turned off and the light sensing pixels may be turned on.

In an embodiment, the light emitting pixels and the light sensing pixels may be disposed in entire display area of the display panel. The display area may include the sensing light emitting area, the first sensing area, the second sensing area, and an off area. In the PPG sensing mode, the light emitting pixels and the light sensing pixels in the off area may be turned off.

In an embodiment, each of the light emitting pixels may include a first transistor generating a driving current, a second transistor transferring a data signal in response to a write signal, a third transistor diode-connecting the first transistor in response to a compensation signal, a fourth transistor transferring an initialization voltage to a gate of the first transistor in response to an initialization signal, a fifth transistor connecting a line of a first power supply voltage and the first transistor in response to an emission signal, a sixth transistor connecting the first transistor and the light emitting element in response to the emission signal, a seventh transistor transferring an anode initialization voltage to the light emitting element in response to a bypass signal, an eighth transistor transferring a bias voltage to a terminal of the first transistor in response to the bypass signal, a storage capacitor connected between the line of the first power supply voltage and the gate of the first transistor, and the light emitting element emitting light based on the driving current.

In an embodiment, each of the light sensing pixels may include a ninth transistor generating a sensing current based on a voltage of an anode of the photoelectric conversion element, a tenth transistor transferring a reset voltage to the anode of the photoelectric conversion element in response to a global reset signal, an eleventh transistor connecting the ninth transistor and the readout line in response to the write signal, and the photoelectric conversion element. In an embodiment, the display device may further include a main processor receiving the PPG signal from the readout circuit and determining a biomarker of a user based on the PPG signal.

A display device according to an embodiment may include a display panel including light emitting pixels and light sensing pixels. Each of the light emitting pixels include a light emitting element, and each of the light sensing pixels include a photoelectric conversion element. The display device also includes a readout circuit connected to the light sensing pixels through readout lines and provided to generate a photoplethysmography (PPG) signal based on the sensing currents received from the light sensing pixels in a PPG sensing mode. In the PPG sensing mode, the light emitting pixels in a sensing light emitting area may be turned on, the light sensing pixels in the sensing light emitting area may be turned off, and reflected light, which is emitted from the sensing light emitting area and reflected from a blood vessel of a finger of a user, may be incident on a partial area of the display panel. In the PPG sensing mode, in a first sensing area where the reflected light is incident, the light emitting pixels may be turned off and the light sensing pixels may be turned on. In the PPG sensing mode, in a second sensing area where the reflected light is not incident, the light emitting pixels may be turned off and the light sensing pixels may be turned on.

An electronic device according to an embodiment may include a display device and a power supply configured to provide power to the display device. The display device may include a display panel including light emitting pixels and light sensing pixels. Each of the light emitting pixels includes a light emitting element, and each of the light sensing pixels includes a photoelectric conversion element. The display device may also include a readout circuit connected to the light sensing pixels through readout lines. When operating in a photoplethysmography (PPG) sensing mode, the readout circuit may receive first sensing current from one or more of the light sensing pixels in a first sensing area adjacent to a sensing light emitting area that emits light, may receive second sensing current from one or more of the light sensing pixels in at least one second sensing area spaced from the first sensing area, and may generate a PPG signal based on the first sensing current and the second sensing current.

In accordance with one or more embodiments, a display device includes a first pixel to emit light reflected by a finger of a user; a light sensing pixel at a position to sense the reflected light; a second pixel at a position that does not sense the reflected light; a sensing circuit to generate a first sensing signal based on a sensing current output from the light sensing pixel and to generate a noise signal based on a sensing current output from the second pixel, and a noise eliminator to subtract the noise signal from the first sensing signal to generate a biological signal of the user. The finger overlaps the first pixel and the second pixel and the light sensing pixel. The biological signal may be a photoplethysmography (PPG) signal. The first pixel may be configured to emit green light. The sensing current output from the second pixel may be generated based on one of a motion artifact, micro-motion, mis-positioning, ambient light, or breathing of the user.

In accordance with one or more of the embodiments described herein, the display device according to embodiments may be operated in a normal mode to display an image or the PPG sensing mode to sense a volume of the blood vessel of the finger of the user. The display device may generate the PPG signal based on signals sensed in each of the first and second sensing areas spaced apart from each other. Accordingly, PPG sensing accuracy of the display device may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the invention.

FIG. 12 is a diagram for explaining a sensing operation in a photoplethysmography (PPG) sensing mode of a display device according to still another embodiment.

DETAILED DESCRIPTION

Figure 1:
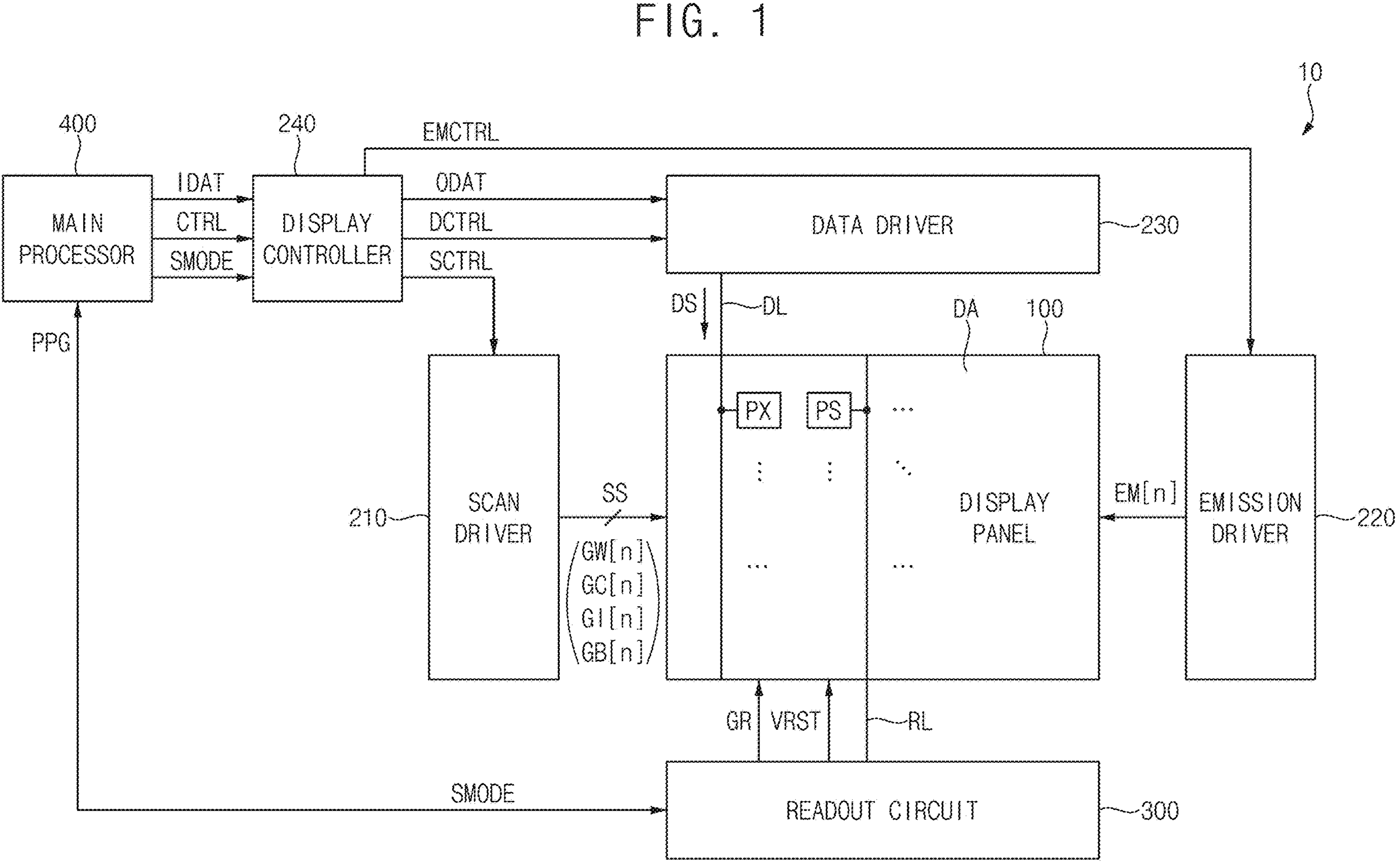
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Illustrative, non-limiting embodiments will be more clearly understood from the following detailed description in conjunction with the accompanying drawings.

Figure 2:
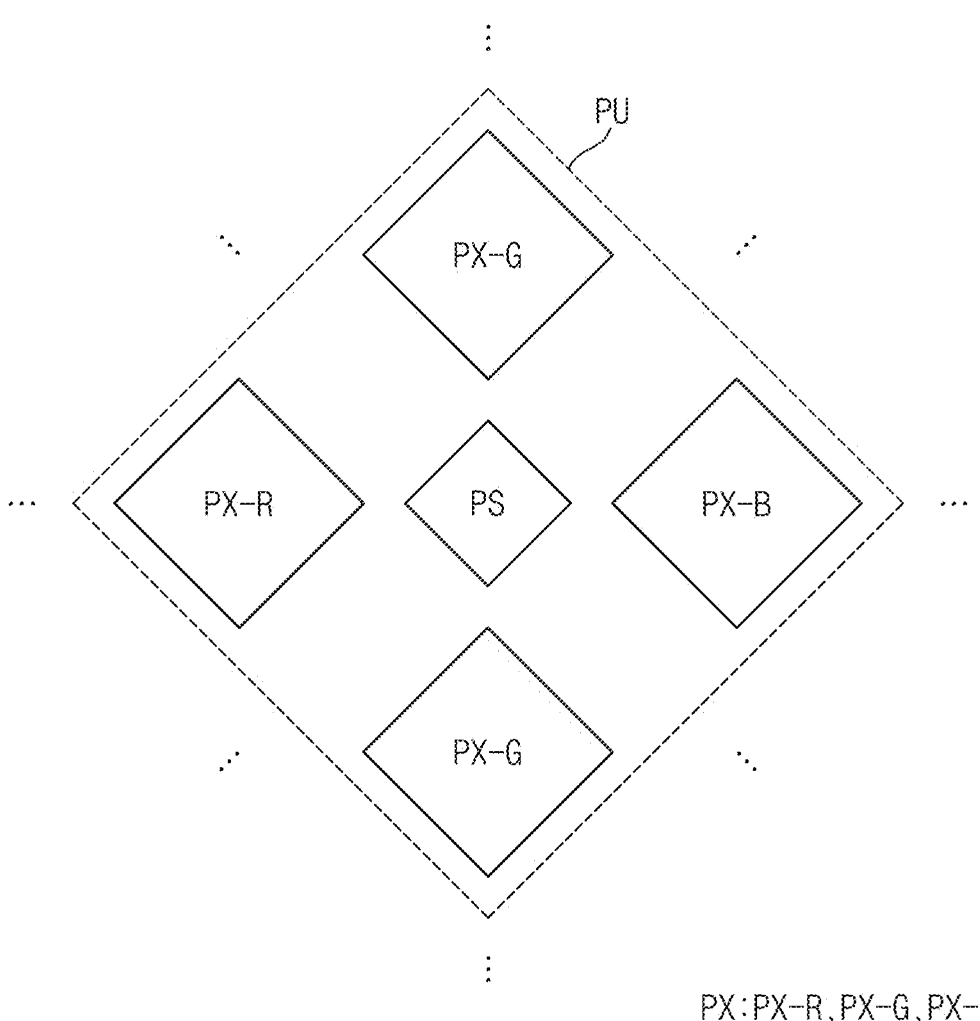
FIG. 2 is a plan view illustrating an example of an arrangement of light emitting pixels and light sensing pixels according to an embodiment.

FIG. 1 is a block diagram illustrating a display device 10 according to an embodiment. FIG. 2 is a plan view illustrating an example of an arrangement of light emitting pixels PX and light sensing pixels PS according to an embodiment.

Referring to FIG. 1, the display device 10 according to embodiments may include a display panel 100 including light emitting pixels PX and light sensing pixels PS, a panel driver driving the display panel 100, and a main processor 400. The panel driver may be a plurality of drivers. For example, the panel driver may a scan driver 210, an emission driver 220, and a data driver 230. The scan driver 210 provides scan signals SS to the light emitting pixels PX and the light sensing pixels PS. The emission driver 220 provides emission signals EM[n] to the light emitting pixels PX. The data driver 230 provides data signals DS to the light emitting pixels PX. Also included is a display controller 240 controlling an operation of each of the scan driver 210, the emission driver 220, and the data driver 230, and a readout circuit 300 connected to the light sensing pixels PS through readout lines RL.

In an embodiment, the display device 10 may be operated in a normal mode to display an image, a fingerprint sensing mode to sense a fingerprint of a user, or a photoplethysmography (PPG) sensing mode to sense a volume of a blood vessel of a finger of the user. This will be described in greater detail later.

The display panel 100 may include a display area DA and a non-display area around the display area DA. The light emitting pixels PX and the light sensing pixels PS may be disposed in the display area DA. In an embodiment, the light emitting pixels PX and the light sensing pixels PS may be disposed throughout the entire display area DA. Each of the light emitting pixels PX may include a light emitting element and may emit light using the light emitting element. For example, as illustrated in FIG. 2, the light emitting pixels PX may include a red light emitting pixel PX-R that emits red light, a green light emitting pixel PX-G that emits green light, and a blue light emitting pixel PX-B that emits blue light. The light emitting pixels may emit light of a different combination of colors in another embodiment. As explained in greater detail below, a predetermined combination of the light emitting elements PX-R, PX-G, and PX-B may form a pixel unit PU. Each of the light sensing pixels PS may include a photoelectric conversion element and my sense light using the photoelectric conversion element.

In an embodiment, the display panel 100 may include one light sensing pixel PS for each light emitting pixel PX. In another embodiment, the display panel 100 may include one light sensing pixel PS corresponding to the plurality of light emitting pixels PX that make up one pixel unit PU. For example, as illustrated in the plan view of FIG. 2, in the display panel 100, one red light emitting pixel PX-R, two green light emitting pixels PX-G, and one blue light emitting pixel PX-B may be disposed in a predetermined (e.g., diamond) shape, and one light sensing pixel PS may be disposed between (e.g., at a center of) the four light emitting pixels PX-R, PX-G, and PX-B disposed in the diamond shape, but embodiments are not limited thereto. In this case, the one light sensing pixel PS and the four light emitting pixels PX-R, PX-G, and PX-B may form one pixel unit PU.

The scan driver 210 may generate the scan signals SS based on a scan control signal SCTRL received from the display controller 240. The scan signals SS may be sequentially provided to the display panel 100 on a row-by-row basis. In an embodiment, the scan control signal SCTRL may include a scan start signal and a scan clock signal, but embodiments are not limited thereto. In an embodiment, the scan driver 210 may generate the scan signals SS such as a write signal GW[n], a compensation signal GC[n], an initialization signal GI[n], and a bypass signal GB[n], may provide the write signal GW[n], the compensation signal GC[n], the initialization signal GI[n], and the bypass signal GB[n] to the light emitting pixels PX, and may provide the write signal GW[n] to the light sensing pixels PS. In addition, in an embodiment, the scan driver 210 may be integrated or formed in the display panel 100. In another embodiment, the scan driver 210 may be implemented as one or more integrated circuits.

The emission driver 220 may generate the emission signals EM[n] based on an emission control signal EMCTRL received from the display controller 240, and may sequentially provide the emission signals EM[n] to the display panel 100 on a row-by-row basis. In an embodiment, the emission control signal EMCTRL may include an emission start signal and an emission clock signal, but embodiments are not limited thereto. In addition, in an embodiment, the emission driver 220 may be integrated or formed in the display panel 100. In another embodiment, the emission driver 220 may be implemented as one or more integrated circuits.

The data driver 230 may generate the data signals DS based on a data control signal DCTRL and an output image data ODAT received from the display controller 240, and may provide the data signals DS to corresponding light emitting pixels PX through data lines DL. In an embodiment, the data control signal DCTRL may include an output data enable signal, a horizontal start signal, and a load signal, but embodiments are not limited thereto. In an embodiment, the data driver 230 and the display controller 240 may be implemented as a single integrated circuit, and the single integrated circuit may be referred to as a timing controller embedded data driver (TED) integrated circuit. In another embodiment, the data driver 230 and the display controller 240 may be implemented as separate integrated circuits.

The display controller 240 may generate the scan control signal SCTRL, the emission control signal EMCTRL, the data control signal DCTRL, and the output image data ODAT based on input image data IDAT and an input control signal CTRL received from the main processor 400. The input image data IDAT may be, for example, RGB image data including red image data, green image data, and blue image data. The input image data IDAT may include a different combination of color image data in another embodiment. In one embodiment, the input control signal CTRL may include a master clock signal and an input data enable signal. The input control signal CTRL may further include a vertical synchronization signal and a horizontal synchronization signal.

The readout circuit 300 may receive sensing currents of the light sensing pixels PS through the readout lines RL, may generate a PPG signal based on the sensing currents, and may provide the PPG signal to the main processor 400. In addition, the readout circuit 300 may substantially simultaneously apply a global reset signal GR to all the light sensing pixels PS of the display panel 100. In an embodiment, the readout circuit 300 may provide a reset voltage VRST to the light sensing pixels PS. In another embodiment, the display device 10 may further include a power management circuit (e.g., the power management circuit 500 of FIG. 7) generating voltages for operation of the display device 10, and the reset voltage VRST provided to the light sensing pixels PS may be generated by the power management circuit. In an embodiment, the readout circuit 300 may be implemented as an integrated circuit, and the integrated circuit may be referred to as a readout integrated circuit (ROIC). In another embodiment, the readout circuit 300 may be included in the data driver 230.

The main processor 400 may control overall operation of the display device 10. For example, the main processor 400 may provide the input image data IDAT and the input control signal CTRL to the display controller 240 so that the display panel 100 displays the image. In addition, the main processor 400 may receive touch data from a touch driving circuit, may determine touch coordinates of the user on the display device 10, and may execute an application indicated by an icon displayed at the user-specified touch coordinates.

The main processor 400 may determine a biomarker of the user based on the PPG signal received from the readout circuit 300. For example, the main processor 400 can determine the user's blood pressure, heart rate, stress level, cardiovascular health, respiratory rate, blood vessel age (or a blood vessel elasticity), oxygen saturation, or the like based on the PPG signal, but embodiments are not limited thereto.

As described above, the display device 10 may be operated in the normal mode, the fingerprint sensing mode, or the PPG sensing mode. The main processor 400 may generate a mode signal SMODE that indicates which one of the normal mode, the fingerprint sensing mode, or the PPG sensing mode is to be performed. In embodiment, the main processor 400 may automatically switch from normal mode to fingerprint sensing mode or PPG sensing mode after a predetermined touch event occurs without the user's additional input action for mode determination. In another embodiment, the main processor 400 may determine the mode after receiving input action for mode determination from the user or a program of the display device 10. The display controller 240 may receive the mode signal SMODE from the main processor 400, and may control operation of the scan driver 210, the emission driver 220, and the data driver 230 based on the received mode signal SMODE. The readout circuit 300 may receive the mode signal SMODE from the main processor 400, may generate the PPG signal or a fingerprint signal based on the received mode signal SMODE, and may provide the PPG signal or the fingerprint signal to the main processor 400.

Figure 3:
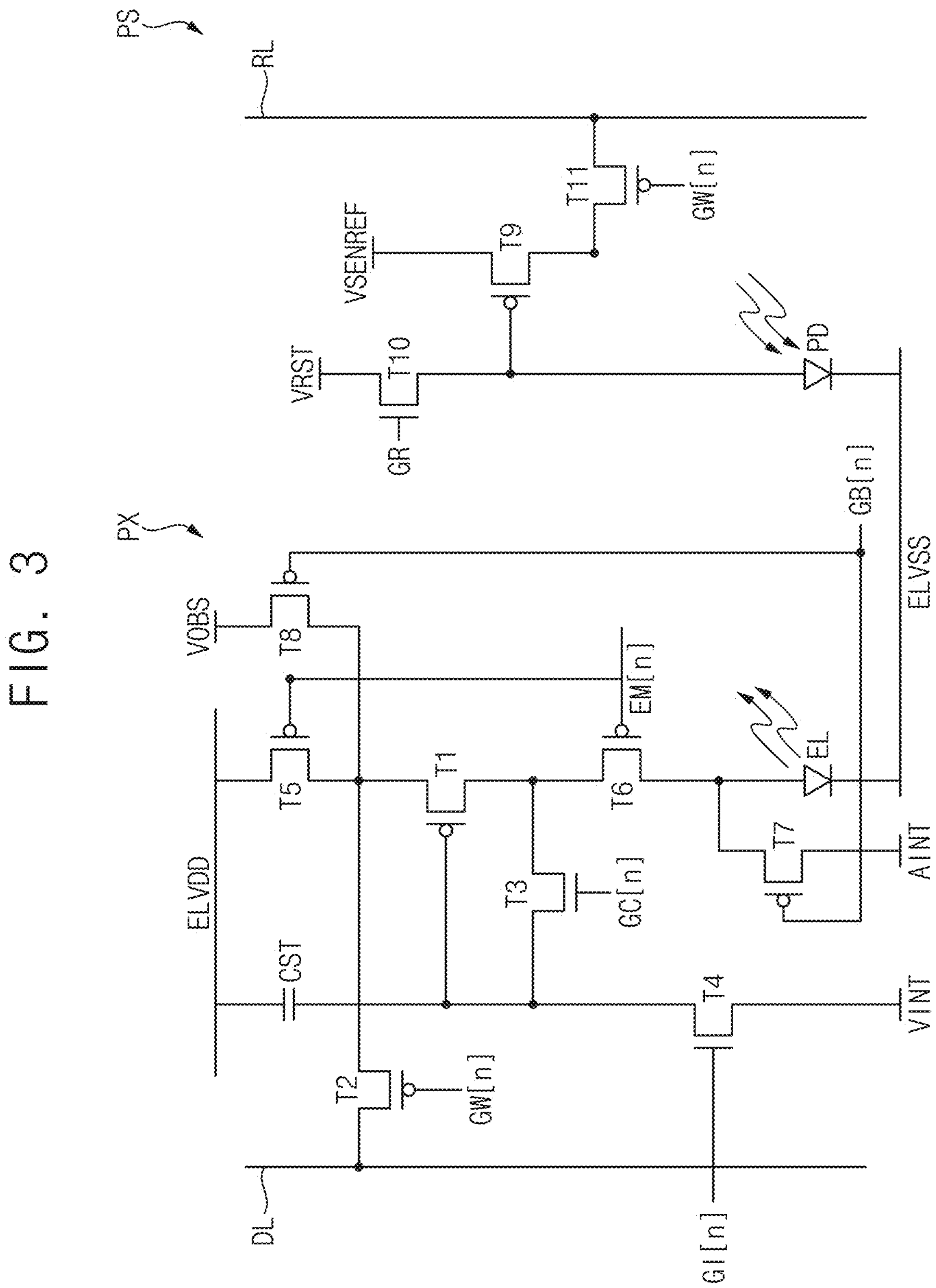
FIG. 3 is a circuit diagram illustrating an example of the light emitting pixel and the light sensing pixel according to an embodiment.

FIG. 3 is a circuit diagram illustrating an example of the light emitting pixel PX and the light sensing pixel PS according to embodiments.

Referring to FIGS. 1 and 3, in an embodiment, the light emitting pixel PX may include a plurality of transistors and at least one capacitor. For example, the light emitting pixel PX may include a first transistor T1, a second transistor T2, a third transistor T3, a fourth transistor T4, a fifth transistor T5, a sixth transistor T6, a seventh transistor T7, an eighth transistor T8, a storage capacitor CST, and the light emitting element EL.

The first transistor T1 may generate a driving current based on a voltage stored in the storage capacitor CST. In an embodiment, the first transistor T1 may include a gate connected to the storage capacitor CST, a first terminal connected to the fifth transistor T5, and a second terminal connected to the sixth transistor T6.

The second transistor T2 may transfer the data signal DS of the data line DL to the first terminal of the first transistor T1 in response to the write signal GW[n]. In an embodiment, the second transistor T2 may include a gate receiving the write signal GW[n], a first terminal connected to the data line DL, and a second terminal connected to the first terminal of the first transistor T1.

The third transistor T3 may place the first transistor T1 in a diode-connected state in response to the compensation signal GC[n]. In an embodiment, the third transistor T3 may include a gate receiving the compensation signal GC[n], a first terminal connected to the second terminal of the first transistor T1, and a second terminal connected to the gate of the first transistor T1.

The fourth transistor T4 may transfer a initialization voltage VINT to the gate of the first transistor T1 in response to the initialization signal GI[n]. In an embodiment, the fourth transistor T4 may include a gate receiving the initialization signal GI[n], a first terminal connected to the gate of the first transistor T1, and a second terminal connected to a line of the initialization voltage VINT.

The fifth transistor T5 may connect a line of a first power supply voltage ELVDD (e.g., a high power supply voltage) and the first transistor T1 in response to the emission signal EM[n]. In an embodiment, the fifth transistor T5 may include a gate receiving the emission signal EM[n], a first terminal connected to the line of the first power supply voltage ELVDD, and a second terminal connected to the first terminal of the first transistor T1.

The sixth transistor T6 may connect the first transistor T1 and the light emitting element EL in response to the emission signal EM[n]. In an embodiment, the sixth transistor T6 may include a gate receiving the emission signal EM[n], a first terminal connected to the second terminal of the first transistor T1, and a second terminal connected to an anode of the light emitting element EL.

The seventh transistor T7 may transfer an anode initialization voltage AINT to the light emitting element EL in response to the bypass signal GB[n]. In an embodiment, the seventh transistor T7 may include a gate receiving the bypass signal GB[n], a first terminal connected to the anode of the light emitting element EL, and a second terminal connected to a line of the anode initialization voltage AINT. In an embodiment, the initialization voltage VINT and the anode initialization voltage AINT may be different voltages from each other. In another embodiment, the initialization voltage VINT and the anode initialization voltage AINT may be substantially the same voltage as each other.

The eighth transistor T8 may transfer a bias voltage VOBS to the first terminal of the first transistor T1 in response to the bypass signal GB[n]. The first transistor T1 may be in an on-state based on the bias voltage VOBS. In an embodiment, the eighth transistor T8 may include a gate receiving the bypass signal GB[n], a first terminal connected to a line of the bias voltage VOBS, and a second terminal connected to the first terminal of the first transistor T1.

The storage capacitor CST may be connected between the line of the first power supply voltage ELVDD and the gate of the first transistor T1. In an embodiment, the storage capacitor CST may include a first electrode connected to the line of the first power supply voltage ELVDD and a second electrode connected to the gate of the first transistor T1.

The light emitting element EL may emit light based on the driving current generated by the first transistor T1. In an embodiment, the light emitting element EL may be an organic light emitting diode (OLED), but embodiments are not limited thereto. In another embodiment, the light emitting element EL may be a nano light emitting diode (NED), a quantum dot (QD) light emitting diode, a micro light emitting diode, an inorganic light emitting diode, or any other suitable light emitting element. In an embodiment, the light emitting element EL may include the anode connected to the sixth transistor T6 and a cathode connected to a line of a second power supply voltage ELVSS (e.g., a low power supply voltage).

In an embodiment, the first to eighth transistors T1 to T8 may be P-type metal-oxide-semiconductor (PMOS) transistors. In another embodiment, the first to eighth transistors T1 to T8 may be N-type metal-oxide-semiconductor (NMOS) transistors. In still another embodiment, some of the first to eighth transistors T1 to T8 may be PMOS transistors, and the others may be NMOS transistors. For example, as illustrated in FIG. 3, the first, second, fifth, sixth, seventh, and eighth transistors T1, T2, T5, T6, T7, and T8 may be PMOS transistors, and the third and fourth transistors T3 and T4 may be NMOS transistors, but embodiments are not limited thereto. Although FIG. 3 illustrates an example of the light emitting pixel PX that includes eight transistors T1 to T8 and one capacitor CST, but the light emitting pixel PX of the display device 10 according to embodiments are not limited to the example of FIG. 3, and may have any structure.

In an embodiment, the light sensing pixel PS may include a ninth transistor T9, a tenth transistor T10, an eleventh transistor T11, and the photoelectric conversion element PD. In this case, the light sensing pixel PS may share at least one of the power supply voltages used by the light emitting pixel PX, e.g., low power supply voltage ELVSS.

The ninth transistor T9 may generate a sensing current based on a voltage of an anode of the photoelectric conversion element PD. In an embodiment, the ninth transistor T9 may include a gate connected to the anode of the photoelectric conversion element PD, a first terminal receiving a sensing reference voltage VSENREF, and a second terminal. In an embodiment, the sensing reference voltage VSENREF may have substantially the same voltage level as the anode initialization voltage AINT, but embodiments are not limited thereto.

The tenth transistor T10 may reset the photoelectric conversion element PD (or the voltage of the anode of the photoelectric conversion element PD) to a reset voltage VRST in response to the global reset signal GR. In an embodiment, the tenth transistor T10 may include a gate receiving the global reset signal GR, a first terminal receiving the reset voltage VRST, and a second terminal connected to the anode of the photoelectric conversion element PD.

The eleventh transistor T11 may transfer the sensing current generated by the ninth transistor T9 to the readout line RL in response to the write signal GW[n]. In an embodiment, the eleventh transistor T11 may include a gate receiving the write signal GW[n], a first terminal connected to the second terminal of the ninth transistor T9, and a second terminal connected to the readout line RL.

The photoelectric conversion element PD may be used to measure light intensity. For example, the photoelectric conversion element PD may be an organic photodiode, but embodiments are not limited thereto. After the voltage of the anode of the photoelectric conversion element PD is reset to the reset voltage VRST, the voltage of the anode of the photoelectric conversion element PD may be increased by different amounts depending on the light intensity. The sensing current of the ninth transistor T9 may be determined according to the voltage of the anode of the photoelectric conversion element PD, and the readout circuit 300 may generate the PPG signal corresponding to the sensing current. In an embodiment, the photoelectric conversion element PD may include the anode connected to the gate of the ninth transistor T9, and a cathode connected to the line of the second (or low) power supply voltage ELVSS.

In an embodiment, the ninth to eleventh transistors T9 to T11 may be PMOS transistors. In another embodiment, the ninth to eleventh transistors T9 to T11 may be NMOS transistors. In still another embodiment, some of the ninth to eleventh transistors T9 to T11 may be PMOS transistors, and the others may be NMOS transistors. For example, as illustrated in FIG. 3, the ninth and eleventh transistors T9 and T11 may be PMOS transistors, and the tenth transistor T10 may be NMOS transistor, but embodiments are not limited thereto. Although FIG. 3 illustrates an example of the light sensing pixel PS that includes three transistors T9 to T11 and one photoelectric conversion element PD, but the light sensing pixel PS of the display device 10 according to embodiments are not limited to the example of FIG. 3, and may have any structure.

Figure 4:
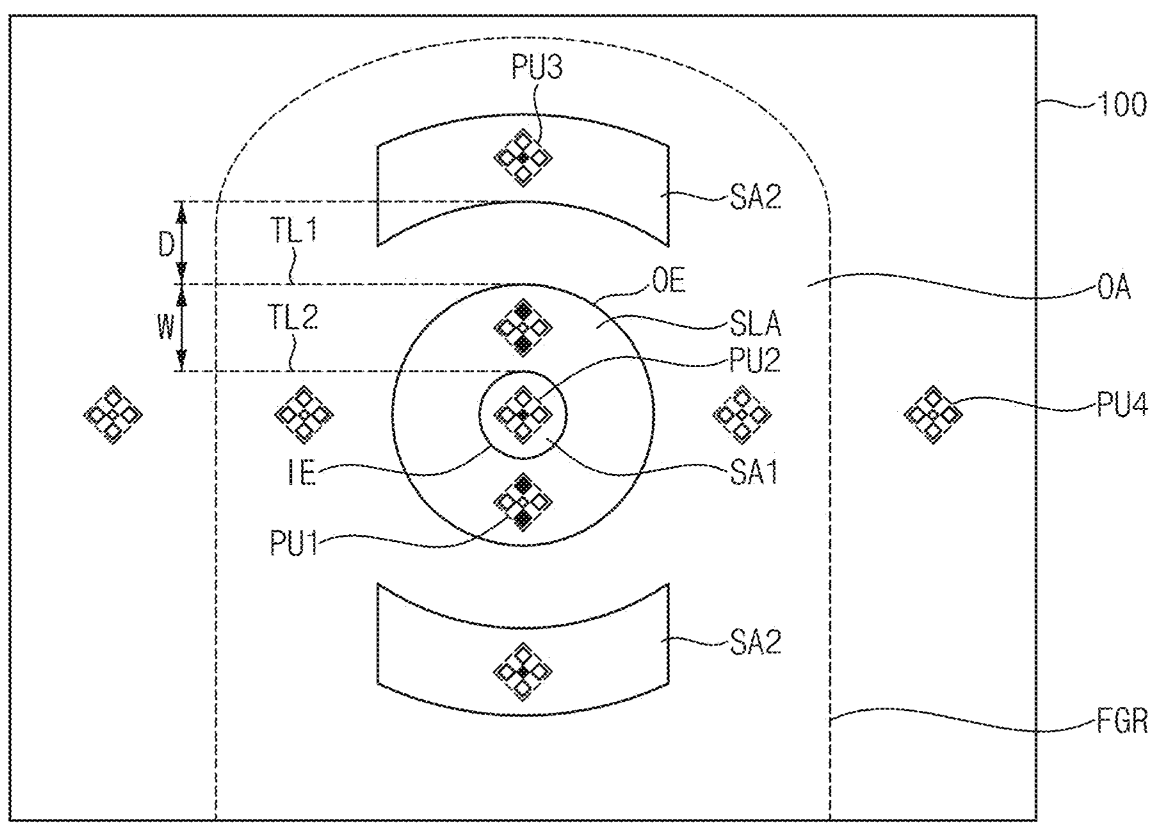
FIGS. 4 and 5 are diagrams for explaining a sensing operation in a photoplethysmography (PPG) sensing mode of a display device according to an embodiment.
Figure 5:
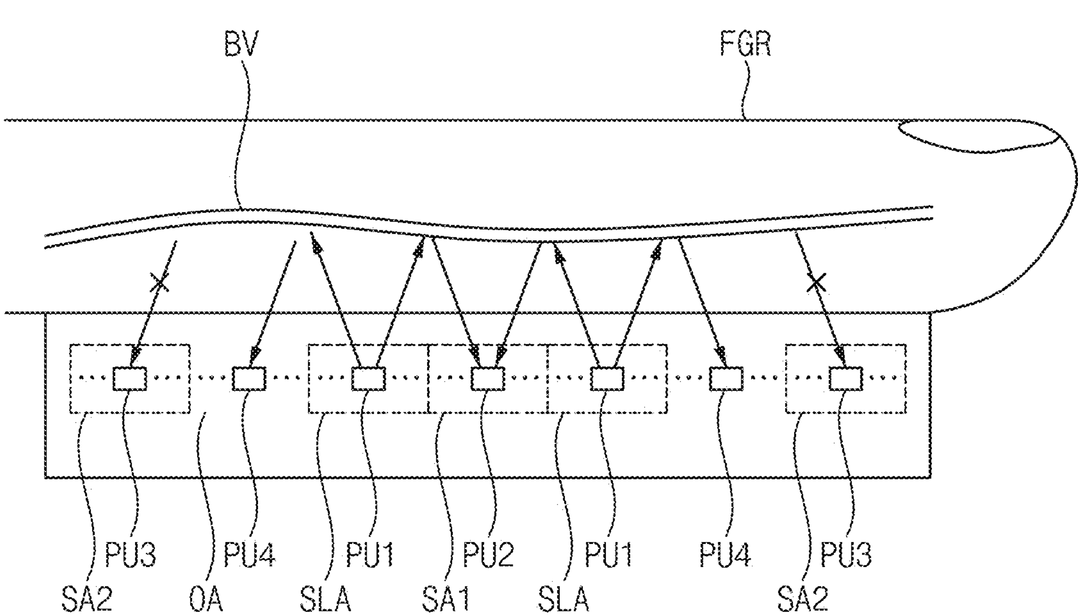
Figure 6:
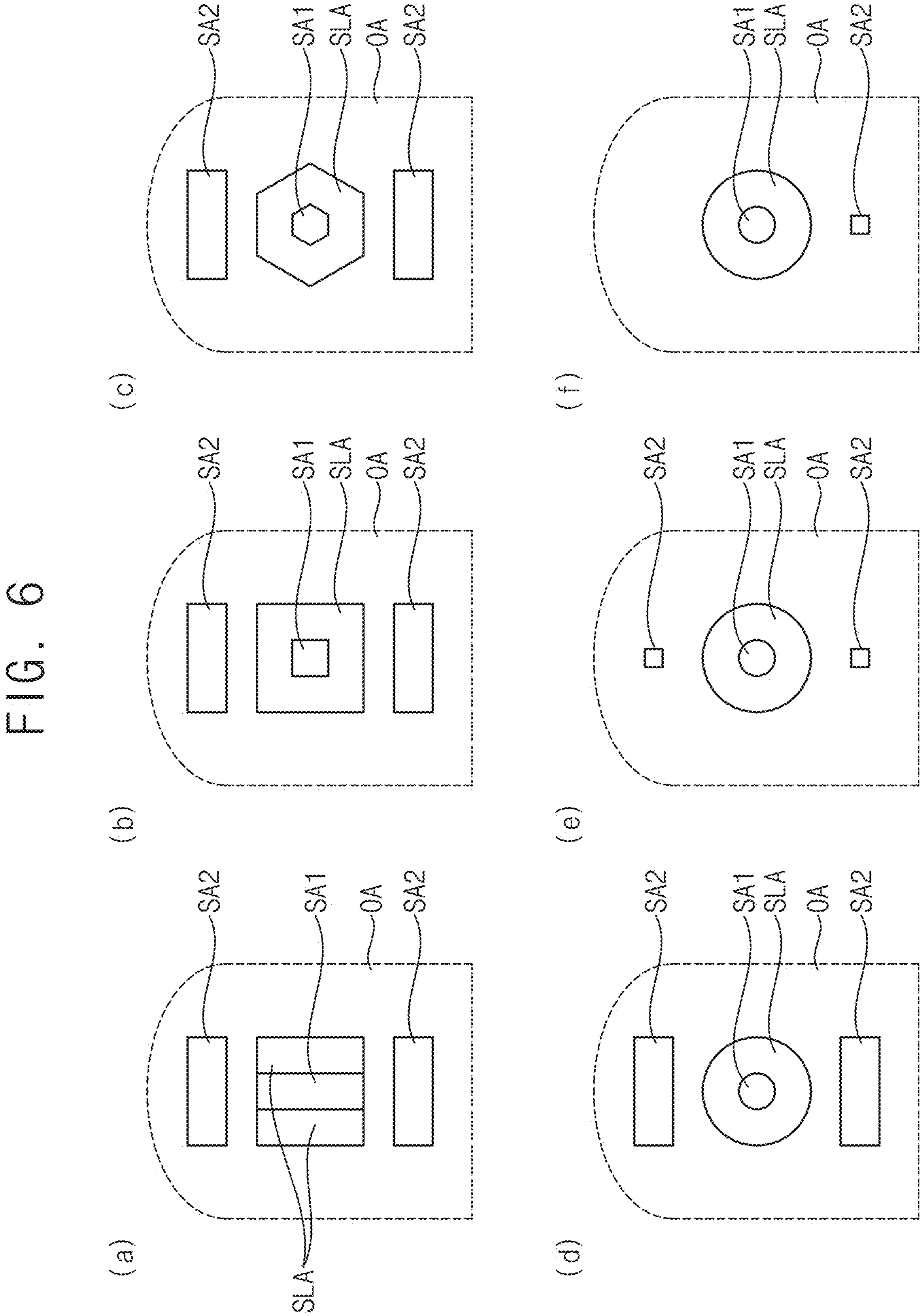
FIG. 6 is a diagram for explaining examples of an arrangement of a sensing area and a sensing light emitting area of the display device of FIGS. 4 and 5.

FIGS. 4 and 5 are diagrams for explaining a sensing operation in a PPG sensing mode of the display device 10 according to an embodiment. FIG. 6 is a diagram for explaining examples of an arrangement of a sensing area and a sensing light emitting area of the display device of FIGS. 4 and 5.

Hereinafter, a sensing operation of the display device 10 according to an embodiment in the PPG sensing mode to sense the volume of the blood vessel BV of the finger FGR of the user will be described in detail.

Referring to FIGS. 1 to 5, in the PPG sensing mode, the display device 10 may drive the light emitting pixels PX to emit light in a sensing light emitting area SLA, and may drive the light sensing pixels PS to sense light in each of a first sensing area SA1 and a second sensing area SA2 spaced apart from each other. In one embodiment, the first sensing area SA1 and the second sensing area SA2 correspond to different areas of a user's finger FGR, as discussed below. When disposed at these locations, a PPG signal may be generated to indicate a condition of the user.

In an embodiment, the sensing light emitting area SLA, the first sensing area SA1, and the second sensing area SA2 may be set in the display area DA. For example, according to the touch coordinates of the finger FGR of the user, the sensing light emitting area SLA, the first sensing area SA1, and the second sensing area SA2 may be set to each overlap the finger FGR. A remaining area of the display area DA except for the sensing light emitting area SLA, the first sensing area SA1, and the second sensing area SA2 may be said to correspond to an off area OA.

Hereinafter, pixel units PU in the sensing light emitting area SLA may be referred to as first pixel units PU1, pixel units PU in the first sensing area SA1 may be referred to as second pixel units PU1, pixel units PU in the second sensing area SA2 may be referred to as third pixel units PU3, and pixel units PU in the off area OA may be referred to as fourth pixel units PU4.

When operating in the PPG sensing mode, the sensing light emitting area SLA may emit light. In the PPG sensing mode, at least one or a predetermined number of the light emitting pixels PX in the sensing light emitting area SLA may be turned on, and the light sensing pixels PS in the sensing light emitting area SLA may be turned off. For example, as illustrated in FIGS. 2 and 4, in the PPG sensing mode, the green light emitting pixel PX-G (e.g., both green light emitting pixels PX-G) included in each of the first pixel units PU1 in the sensing light-emitting area SLA may be turned on. In this case, in the PPG sensing mode, the red light emitting pixel PX-R, the blue light emitting pixel PX-B, and the light sensing pixel PS included in each of the first pixel units PU1 in the sensing light-emitting area SLA may be turned off. Thus, in the PPG sensing mode, the sensing light emitting area SLA may emit green light, but embodiments are not limited thereto. In other embodiments, a different type or combination of light emitting signals may be turned on.

In the PPG sensing mode, the first sensing area SA1 may sense light, e.g., the light emitted by the pixels turned on in the sensing light emitting area may be reflected by the finger FGR and detected or sensed by the light sensing pixel(s) PS in the first sensing area SA1. For example, in the PPG sensing mode, the light emitting pixels PX in the first sensing area SA1 may be turned off, and the light sensing pixels PS in the first sensing area SA1 may be turned on. For example, as illustrated in FIGS. 2 and 4, in the PPG sensing mode, the red light emitting pixel PX-R, the green light emitting pixel PX-G, and the blue light emitting pixel PX-B included in each of the second pixel units PU2 in the first sensing area SA1 may be turned off. In the PPG sensing mode, the light sensing pixel PS included in each of the second pixel units PU2 in the first sensing area SA1 may be turned on.

As illustrated in FIG. 5, in the PPG sensing mode, light (e.g., green light) emitted from the sensing light emitting area SLA may be reflected from a blood vessel BV of the finger FGR of the user. The reflected light may be incident in the first sensing area SA1. The light sensing pixel(s) PS in the first sensing area SA1 may sense the reflected light. A light intensity of the reflected light reflected from the blood vessel BV may vary depending on the volume of the blood vessel BV. For example, when the heart of the user contracts and the volume of the blood vessel BV increases, the number of hemoglobin in the blood vessel BV may increase, the light intensity absorbed by the hemoglobin may increase, and the light sensing pixel PS may measure a relatively low light intensity of reflected light. In contrast, when the heart of the user expands (or relaxes) and the volume of the blood vessel BV decreases, the number of hemoglobin in the blood vessel BV may decrease, and the light intensity absorbed by the hemoglobin may decrease. As a result, the light sensing pixel PS may measure a relatively high light intensity of the reflected light. The light sensing pixels PS in the first sensing area SA1 may generate the sensing current corresponding to the light intensity of the reflected light.

In the PPG sensing mode, the second sensing area SA2 may sense light. In the PPG sensing mode, the light emitting pixels PX in the second sensing area SA2 may be turned off, and the light sensing pixels PS in the second sensing area SA2 may be turned on. For example, as illustrated in FIGS. 2 and 4, in the PPG sensing mode, the red light emitting pixel PX-R, the green light emitting pixel PX-G, and the blue light emitting pixel PX-B included in each of the third pixel units PU3 in the second sensing area SA2 may be turned off. In the PPG sensing mode, the light sensing pixel PS included in each of the third pixel units PU3 in the second sensing area SA2 may be turned on.

As illustrated in FIG. 5, in the PPG sensing mode, light (e.g., green light) emitted from the sensing light emitting area SLA may be reflected from the blood vessel BV of the finger FGR of the user, but the reflected light may not be incident in the second sensing area SA2. The light sensing pixels PS in the second sensing area SA2 may sense incident light, which is incident due to various causes (e.g., motion artifact, micro-motion, mis-positioning, ambient light, breathing, or the like), not the reflected light. The light sensing pixels PS may output a signal indicative of a noise component that is not attributed to the light reflected from the blood vessel BV. For example, the light sensing pixels PS in the second sensing area SA2 may generate sensing current corresponding to the light intensity of the incident light corresponding to the noise component. As discussed in greater detail below, the noise component may be subtracted from a sensing signal generated based on the output of (e.g., current from) one or more light sensing pixels PS in the first sensing area SA1. In one embodiment, the light sensing pixel(s) PS in the second sensing area SA2 may generate sensing current from effects that are not directly related to reflected light but may nevertheless be used to sense noise components that are to be used in generating a more accurate biological (e.g., PPG) signal. In this case, the light sensing pixel may be located in a pixel unit (e.g., PU4 in FIG. 12) that does not overlap the finger of a user.

The readout circuit 300 may generate a sensing signal based on the sensing current of the light sensing pixels PS in the first sensing area SA1, and may generate a noise signal based on the sensing current of the light sensing pixels PS in the second sensing area SA2. The sensing signal may include not only data of the volume of the blood vessel BV over time (which is obtained by sensing the reflected light), but also noise. The noise signal may include a noise due to the aforementioned various causes, not of the reflected light. The readout circuit 300 may effectively remove noise from the sensing signal based on the sensing signal and the noise signal. Accordingly, the readout circuit 300 may generate the PPG signal that represents the volume of the blood vessel BV over time and has a low signal noise ratio (SNR). That is, PPG sensing accuracy (or PPG sensing ability) of the display device 10 may be improved by reducing or eliminating the effect of noise in the sensing signal. This will be described in detail later with reference to FIG. 7.

In the PPG sensing mode, the red light emitting pixel PX-R, the green light emitting pixel PX-G, the blue light emitting pixel PX-B, and the light sensing pixel PS included in each of the fourth pixel units PU4 in the off area OA may both be turned off.

As shown in FIGS. 4 and 5, the first sensing area SA1 may be adjacent to the sensing light emitting area SLA so that the reflected light can be incident in the first sensing area SA1. For example, the sensing light emitting area SLA may adjoin (or contact) the first sensing area SA1 in a plan view. The sensing light emitting area SLA may surround at least a portion of the first sensing area SA1 in a plan view (e.g., see FIG. 4). For example, as illustrated in FIG. 4, when the first sensing area SA1 has a circular shape in a plan view, the sensing light emitting area SLA may have a circular ring shape surrounding the first sensing area SA1 in a plan view, but embodiments are not limited thereto. For example, a planar shape of each of the sensing light emitting area SLA and the first sensing area SA1 may be variously modified, for example, as illustrated in FIGS. 6A to 6C.

The second sensing area SA2 may be spaced apart from the sensing light emitting area SLA, so that the reflected light does not fall incident in the second sensing area SA2. The second sensing area SA2 may be set to have various positions, various sizes, and various shapes such that the second sensing area SA2 is in an area overlapping the finger FGR at a location where the reflected light does not fall incident in the second sensing area SA2. For example, a distance D between the sensing light emitting area SLA and the second sensing area SA2 may be greater than or equal to a width W of the ring-shaped sensing light emitting area SLA, but embodiments are not limited thereto. In the embodiment of FIG. 4, the distance D between the sensing light emitting area SLA and the second sensing area SA2 may be defined as a minimum distance between the sensing light emitting area SLA and the second sensing area SA2. The width W of the sensing light emitting area SLA may be defined as a distance between a first tangent line TL1, which is tangential to an outer edge OE of the sensing light emitting area SLA, and a second tangent line TL2, which is tangential to an inner edge IE of the sensing light emitting area SLA adjacent to the first sensing area SA1 and is parallel to the first tangent line TL1.

In an embodiment, as illustrated in FIG. 4, the second sensing area SA2 may have a planar shape corresponding to the planar shape of the sensing light emitting area SLA. For example, when the sensing light emitting area SLA has the circular ring (or annular) shape in a plan view, the second sensing area SA2 may have a curved rectangular shape in a plan view, but embodiments are not limited thereto. For example, as illustrated in FIG. 6D, the second sensing area SA2 may have a planar shape that does not correspond to the planar shape of the sensing light emitting area SLA.

In an embodiment, as illustrated in FIG. 4, a plurality of second sensing areas SA2 may be provided, and the plurality of second sensing areas SA2 may be positioned at opposing sides of the sensing light emitting area SLA. In addition, the size of each of the second sensing areas SA2 may be greater than the size of the first sensing area SA1, but embodiments are not limited thereto. For example, as illustrated in FIG. 6E, the size of each of the second sensing areas SA2 may be less than the size of the first sensing area SA1. In addition, as illustrated in FIG. 6F, only one second sensing area SA2 may be provided, and the second sensing area SA2 may be positioned at a predetermined side of the sensing light emitting area SLA.

Figure 7:
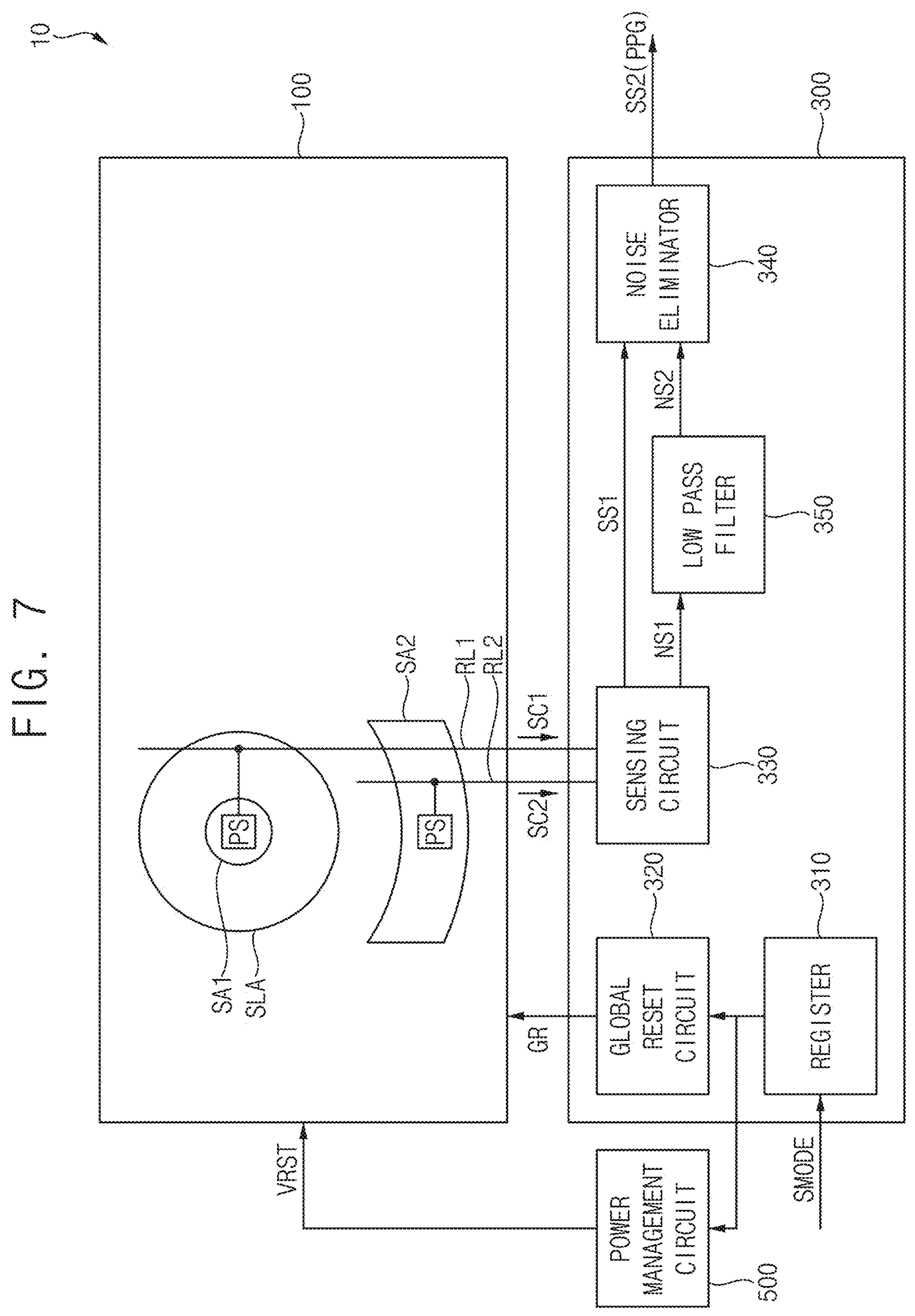
FIG. 7 is a diagram illustrating an example of a readout circuit included in the display device of FIGS. 4 and 5.

FIG. 7 is a diagram illustrating an example of the readout circuit 200 included in the display device 10 of FIGS. 4 and 5.

Referring to FIGS. 1 and 7, in an embodiment, the readout circuit 300 may include a register 310, a global reset circuit 320, a sensing circuit 330, a noise eliminator 340, and a low pass filter 350. The register 310 may store setting values for the global reset signal GR and the reset voltage VRST in each of the normal mode, the fingerprint sensing mode, and the PPG sensing mode. In addition, the register 310 may receive the mode signal SMODE, which indicates the normal mode, the fingerprint sensing mode, or the PPG sensing mode, from the main processor 400, and may provide one or more setting values corresponding to a driving mode indicated by the mode signal SMODE to the global reset circuit 320 and/or the power management circuit 500.

The global reset circuit 320 may generate the global reset signal GR provided to the light sensing pixels PS of the display panel 100. In an embodiment, the global reset signal GR may be substantially simultaneously provided to all or a portion of the light sensing pixels PS of the display panel 100. The global reset circuit 320 may change at least one of voltage level, timing, waveform, or slew rate of the global reset signal GR based on the setting value provided from the register 310.

The power management circuit 500 may change a voltage level of the reset voltage VRST based on the one or more setting values provided from the register 310. In an embodiment, the power management circuit 500 may be included in the ROIC in which the readout circuit 300 is implemented. In another embodiment, the power management circuit 500 may be implemented as an integrated circuit different from the ROIC, and the integrated circuit may be referred to as a power management integrated circuit (PMIC).

The sensing circuit 330 may be electrically connected to the light sensing pixels PS of the display panel 100 through corresponding readout lines RL. The sensing circuit 330 may receive the sensing currents of the light sensing pixels PS through the readout lines RL, may convert the sensing currents to digital signals, and may output the digital signals.

As shown in FIG. 7, the sensing circuit 330 may receive a sensing current SC1 of at least one of the light sensing pixels PS in the first sensing area SA1 through first readout lines RL1, and may generate a first sensing signal SS1 corresponding to the sensing current SC1. The first sensing signal SS1 may include not only data of the volume of the blood vessel BV over time, which is obtained by sensing the light reflected from the blood vessel BV, but also a component of noise.

The sensing circuit 330 may also receive a sensing current SC2 of at least one of the light sensing pixels PS in the second sensing area SA2 through second readout lines RL2, and may generate a first noise signal NS1 corresponding to the sensing currents SC2. The first noise signal NS1 may include a component of noise due to by the various causes not associated with the reflected light.

The low pass filter 350 may receive the first noise signal NS1 from the sensing circuit 330, and may generate a second noise signal NS2 from the first noise signal NS1 by blocking frequency components of a cut-off frequency or greater and passing only low frequency components less than the cut-off frequency. The low frequency components may be present in the first sensing signal and are to be removed to produce a more accurate indication of the biological (e.g., PPG signal). For example, the cut-off frequency may be about 0.5 Hz, but embodiments are not limited thereto.

The noise eliminator 340 may receive the first sensing signal SS1 from the sensing circuit 330, may receive the second noise signal NS2 from the low pass filter 350, and may generate a second sensing signal SS2 based on the first sensing signal SS1 and the second noise signal NS2. For example, the noise eliminator 340 may generate the second sensing signal SS2 by subtracting the second noise signal NS2 from the first sensing signal SS1. In an embodiment, the second sensing signal SS2 may be a PPG signal transferred to the main processor 400. In another embodiment, the readout circuit 300 may further include various filters (e.g., a band pass filter (BPF), or the like) for additionally filtering the second sensing signal SS2 (e.g., for additionally removing noise from the second sensing signal SS2), and a signal obtained by additionally filtering the second sensing signal SS2 may be the PPG signal transferred to the main processor 400.

The main processor 400 may determine the biomarker of the user based on the PPG signal received from the readout circuit 300.

Figure 8:
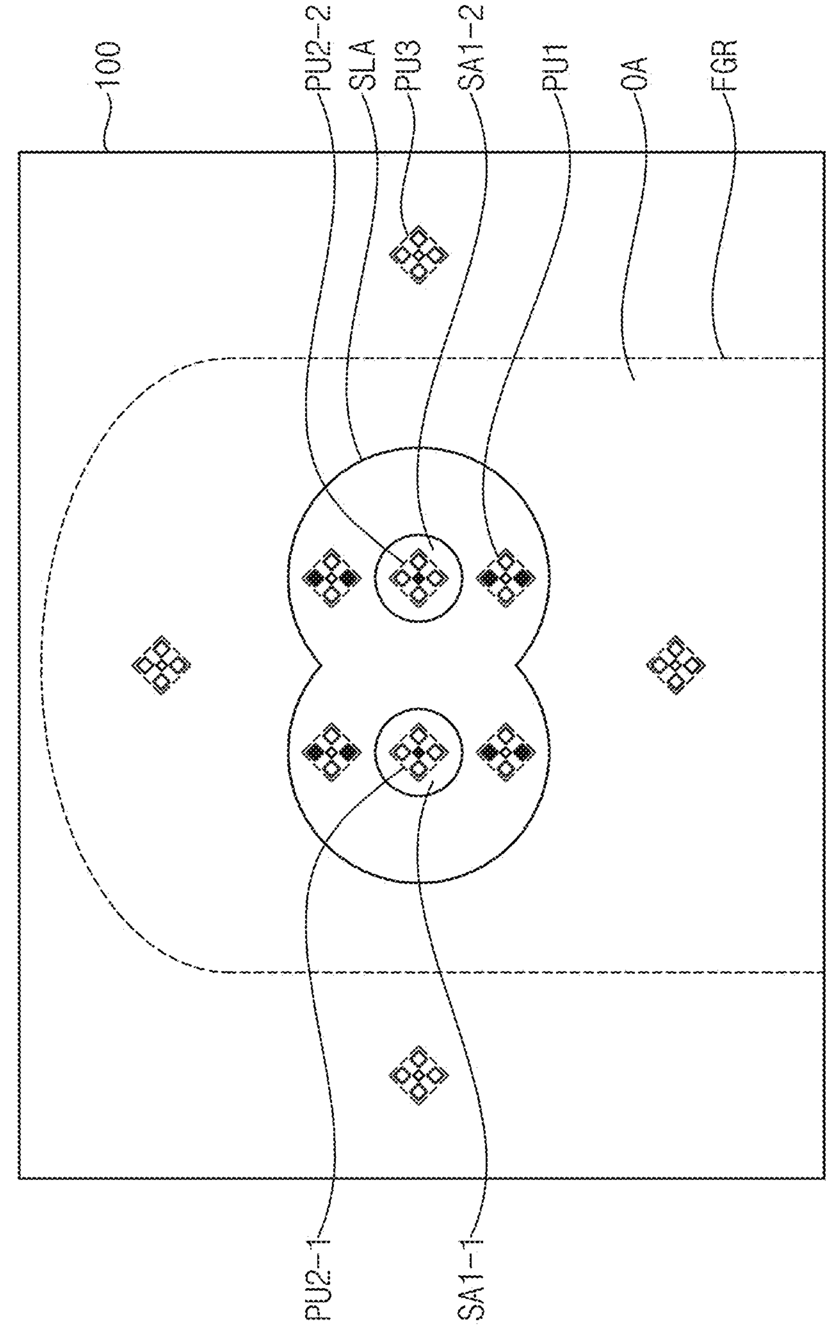
FIG. 8 is a diagram for explaining a sensing operation in a photoplethysmography (PPG) sensing mode of a display device according to another embodiment.
Figure 9:
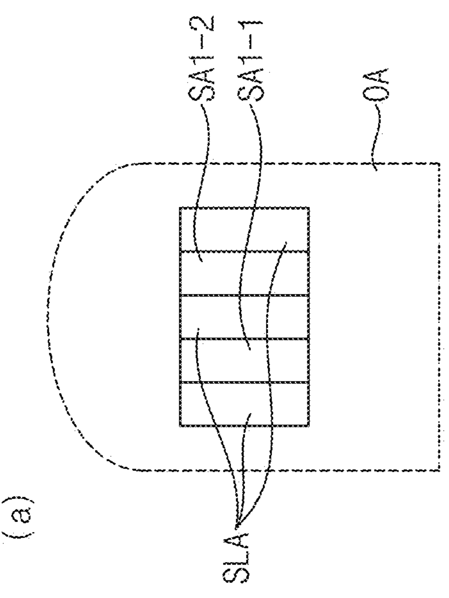
FIG. 9 is a diagram for explaining examples of an arrangement of a sensing area and a sensing light emitting area of the display device of FIG. 8.
Figure 9:
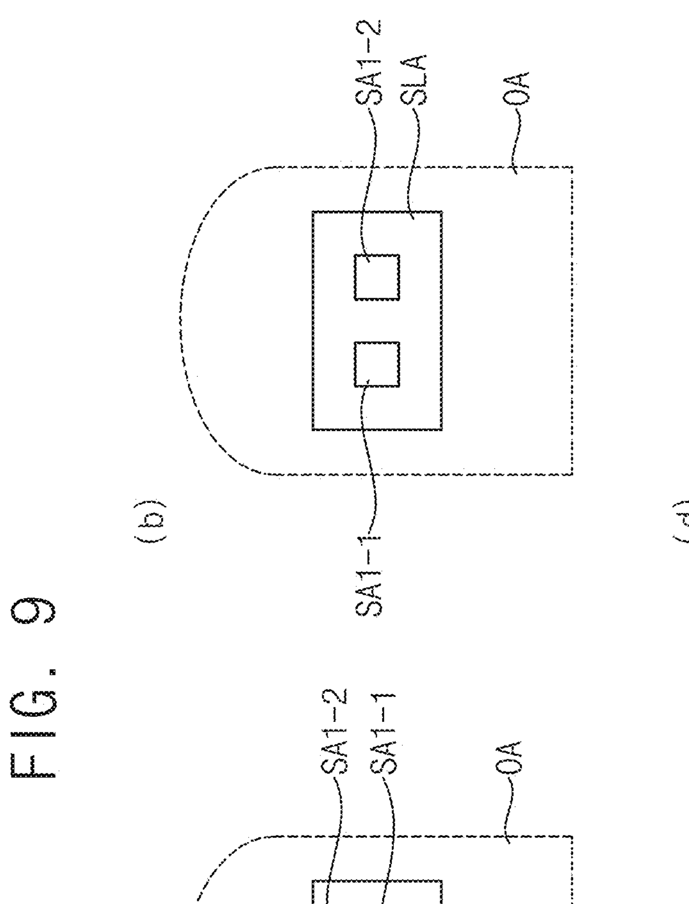
Figure 9:
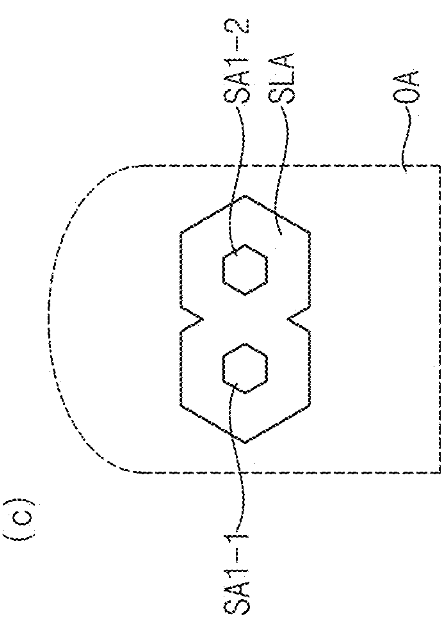
Figure 9:
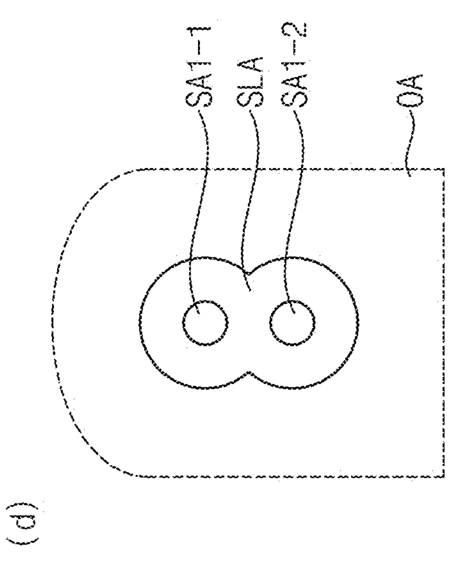
Figure 10:
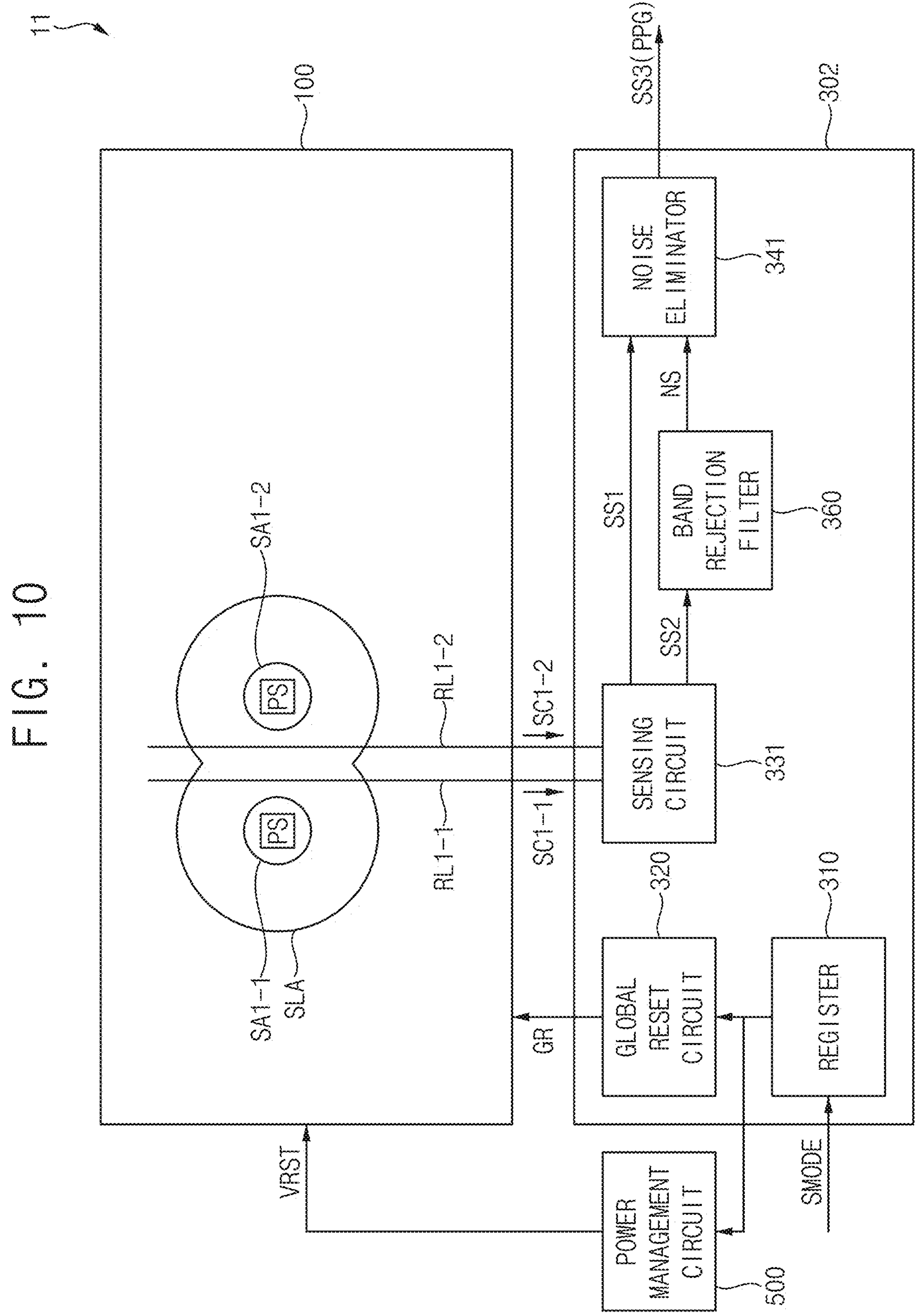
FIG. 10 is a diagram illustrating an example of a readout circuit included in the display device of FIG. 8.

FIG. 8 is a diagram for explaining a sensing operation in a PPG sensing mode of a display device 11 according to another embodiment FIG. 9 is a diagram for explaining examples of an arrangement of a sensing area and a sensing light emitting area of the display device 11 of FIG. 8. FIG. 10 is a diagram illustrating an example of a readout circuit included in the display device 11 of FIG. 8.

The display device 11 according to another embodiment described with reference to FIGS. 8 to 10 may be substantially the same or similar to the display device 10 described with reference to FIGS. 1 to 7, except that a readout circuit 301 is partially changed and the sensing light emitting area SLA and the sensing area are configured differently in the PPG sensing mode. Therefore, repeated descriptions may be omitted or simplified.

Referring to FIGS. 1, 2, 8, 9, and 10, in the PPG sensing mode, the display device 11 may drive the light emitting pixels PX to emit light in a sensing light emitting area SLA, and may drive the light sensing pixels PS to sense light in each of a first-first sensing area SA1-1 and a first-second sensing area SA1-2 spaced apart from each other.

In an embodiment, the sensing light emitting area SLA, the first-first sensing area SA1-1, and the first-second sensing area SA1-2 may be set in the display area DA. For example, according to the touch coordinates of the finger FGR of the user, each of the sensing light emitting area SLA, the first-first sensing area SA1-1, and the first-second sensing area SA1-2 may be set to overlap the finger FGR. A remaining area of the display area DA except for the sensing light emitting area SLA, the first-first sensing area SA1-1, and the first-second sensing area SA1-2 may be an off area OA.

Hereinafter, pixel units PU in the sensing light emitting area SLA may be referred to as first pixel units PU1, pixel units PU in the first-first sensing area SA1-1 may be referred to as second-first pixel units PU2-1, pixel units PU in the first-second sensing area SA1-2 may be referred to as second-second pixel units PU2-2, and pixel units PU in the off area OA may be referred to as third pixel units PU3.

In the PPG sensing mode, the sensing light emitting area SLA may emit light that is to be reflected by the finger of a user, e.g., that is reflected by a blood vessel in the finger. In the PPG sensing mode, one or more of the light emitting pixels PX in the sensing light emitting area SLA may be turned on, and the light sensing pixels PS in the sensing light emitting area SLA may be turned off. For example, as illustrated in FIGS. 2 and 8, in the PPG sensing mode, the green light emitting pixel PX-G included in each of the first pixel units PU1 in the sensing light-emitting area SLA may be turned on. In the PPG sensing mode, the red light emitting pixel PX-R, the blue light emitting pixel PX-B, and the light sensing pixel PS included in each of the first pixel units PU1 in the sensing light-emitting area SLA may be turned off. Thus, in the PPG sensing mode, the sensing light emitting area SLA may emit green light, but embodiments are not limited thereto.

In the PPG sensing mode, each of the first-first sensing area SA1-1 and the first-second sensing area SA1-2 may sense light. In the PPG sensing mode, the light emitting pixels PX in each of the first-first sensing area SA1-1 and the first-second sensing area SA1-2 may be turned off, and the light sensing pixels PS in each of the first-first sensing area SA1-1 and the first-second sensing area SA1-2 may be turned on. For example, as illustrated in FIGS. 2 and 8, in the PPG sensing mode, the red light emitting pixel PX-R, the green light emitting pixel PX-G, and the blue light emitting pixel PX-B included in each of the second-first pixel units PU2-1 in the first-first sensing area SA1-1 may be turned off. In the PPG sensing mode, the light sensing pixel PS included in each of the second-first pixel units PU2-1 in the first-first sensing area SA1-1 may be turned on. In addition, in the PPG sensing mode, the red light emitting pixel PX-R, the green light emitting pixel PX-G, and the blue light emitting pixel PX-B included in each of the second-second pixel units PU2-2 in the first-second sensing area SA1-2 may be turned off. In the PPG sensing mode, the light sensing pixel PS included in each of the second-second pixel units PU2-2 in the first-second sensing area SA1-2 may be turned on.

In the PPG sensing mode, light emitted from the sensing light emitting area SLA may be reflected from the blood vessel of the finger of the user, and the reflected light may be incident in each of the first-first sensing area SA1-1 and the first-second sensing area SA1-2. The light sensing pixels PS in each of the first-first sensing area SA1-1 and the first-second sensing area SA1-2 may sense the reflected light.

In the PPG sensing mode, the red light emitting pixel PX-R, the green light emitting pixel PX-G, the blue light emitting pixel PX-B, and the light sensing pixel PS included in each of the third pixel units PU3 in the off area OA may both be turned off.

The first-first sensing area SA1-1 and the first-second sensing area SA1-2 may be spaced apart from each other. Each of the first-first sensing area SA1-1 and the first-second sensing area SA1-2 may be adjacent to the sensing light emitting area SLA so that the reflected light can be incident in each of the first-first sensing area SA1-1 and the first-second sensing area SA1-2. For example, the sensing light emitting area SLA may adjoin (or contact) both the first-first sensing area SA1-1 and the first-second sensing area SA1-2 in a plan view. For example, the sensing light emitting area SLA may surround at least a portion of each of the first-first sensing area SA1-1 and the first-second sensing area SA1-2 in a plan view. For example, as illustrated in FIG. 8, when the first-first sensing area SA1-1 and the first-second sensing area SA1-2 have circular shapes spaced apart from each other in a plan view, the sensing light emitting area SLA may have a FIG. 8 or '∞' shape surrounding the first-first sensing area SA1-1 and the first-second sensing area SA1-2 in a plan view, but embodiments are not limited thereto. For example, the planar shape of each of the sensing light emitting area SLA, the first-first sensing area SA1-1, and the first-second sensing area SA1-2 may be variously modified, for example, as illustrated in FIGS. 9A to 9D.

In an embodiment, the readout circuit 301 may include a register 310, a global reset circuit 320, a sensing circuit 331, a noise eliminator 341, and a band rejection filter 360. The register 310 and the global reset circuit 320 of the readout circuit 301 may be substantially the same or similar to the register 310 and the global reset circuit 320 of the readout circuit 300 described with reference to FIG. 7.

The sensing circuit 331 may receive sensing currents SC1-1 of the light sensing pixels PS in the first-first sensing area SA1-1 through first-first readout lines RL1-1, and may generate a first sensing signal SS1 corresponding to the sensing currents SC1-1. The sensing circuit 331 may receive sensing currents SC1-2 of the light sensing pixels PS in the first-second sensing area SA1-2 through first-second readout lines RL1-2, and may generate a second sensing signal SS2 corresponding to the sensing currents SC1-2. Each of the first sensing signal SS1 and the second sensing signal SS2 may include not only data of the volume of the blood vessel BV over time, which is obtained by sensing the reflected light, but also a noise component.

The band rejection filter 360 may receive the second sensing signal SS2 from the sensing circuit 331, and may generate a noise signal NS from the second sensing signal SS2 by blocking frequency components in a stop band and passing only frequency components in a remaining frequency band excluding the stop band. For example, the stop band may be about 0.7 Hz to about 7.2 Hz, but embodiments are not limited thereto.

The noise eliminator 341 may receive the first sensing signal SS1 from the sensing circuit 331, may receive the noise signal NS from the band rejection filter 360, and may generate a third sensing signal SS3 based on the first sensing signal SS1 and the noise signal NS. For example, the noise eliminator 341 may generate the third sensing signal SS3 by subtracting the noise signal NS from the first sensing signal SS1, thereby generating a PPG signal which is adjusted to exclude noise to produce a more accurate indication of the PPG of the user. In an embodiment, the third sensing signal SS3 may be the PPG signal transferred to the main processor 400. In another embodiment, the readout circuit 301 may further include various filters (e.g., BPF, or the like) for additionally filtering the third sensing signal SS3 (e.g., for additionally removing noise from the third sensing signal SS3), and a signal obtained by additionally filtering the third sensing signal SS3 may be the PPG signal transferred to the main processor 400.

Figure 11:
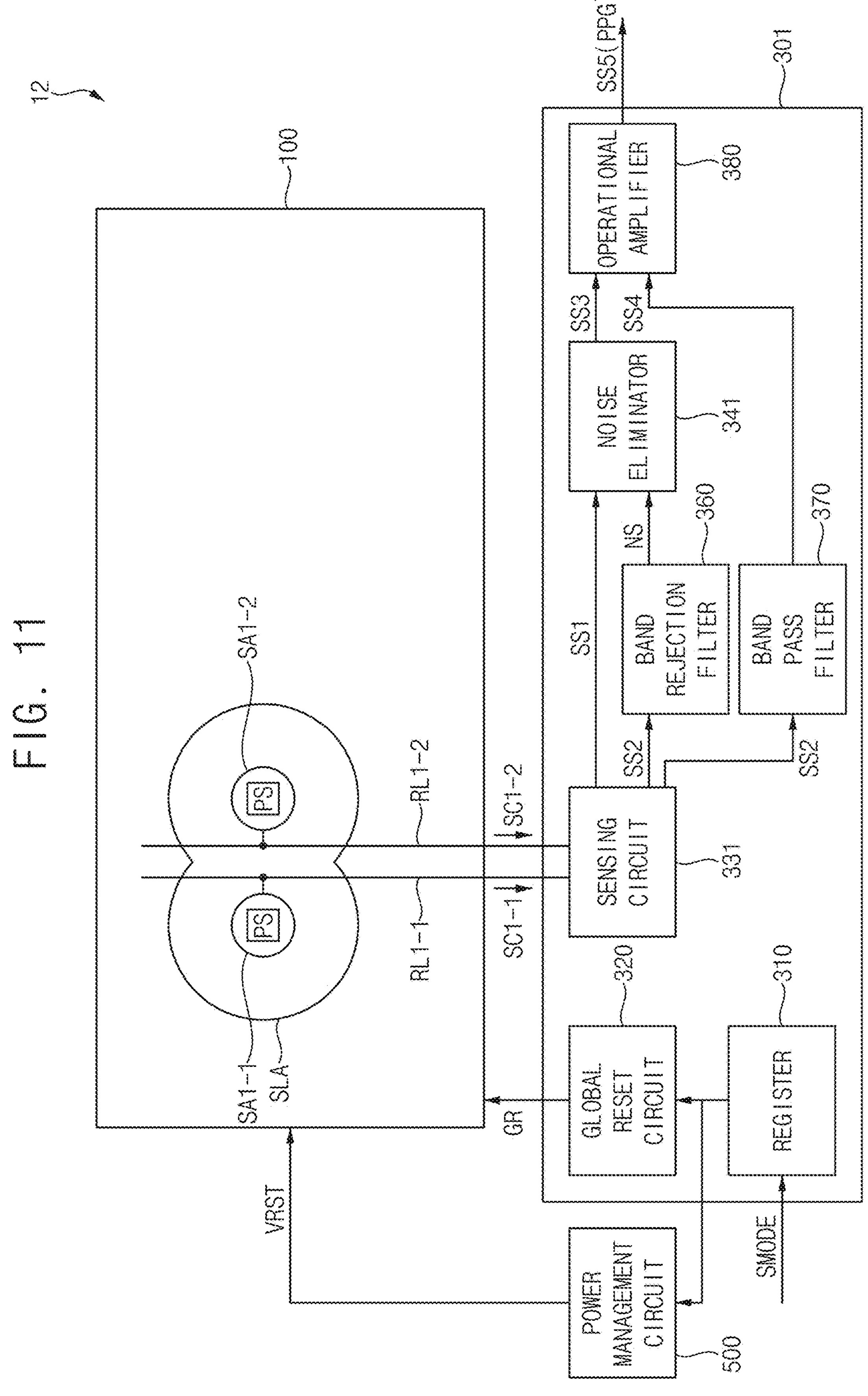
FIG. 11 is a diagram illustrating another example of the readout circuit included in the display device of FIG. 8.

FIG. 11 is a diagram illustrating another example of the readout circuit included in the display device of FIG. 8. A display device 12 according to another embodiment described with reference to FIG. 11 may be substantially the same or similar to the display device 11 described with reference to FIG. 10, except that a readout circuit 302 is partially changed. Therefore, repeated descriptions may be omitted or simplified.

Referring to FIG. 11, in an embodiment, the readout circuit 302 may include a register 310, a global reset circuit 320, a sensing circuit 331, a noise eliminator 341, a band rejection filter 360, a band pass filter 370, and an operational amplifier 380. The sensing circuit 331, the noise eliminator 341, and the band rejection filter 360 of the readout circuit 302 may be substantially the same or similar to the sensing circuit 331, the noise eliminator 341, and the band rejection filter 360 of the readout circuit 301 described with reference to FIG. 10.

The band pass filter 370 may receive the second sensing signal SS2 from the sensing circuit 331, and may generate a fourth sensing signal SS4 from the second sensing signal SS2 by only passing frequency components in the pass band of the band pass filter 370 and blocking frequency components in a remaining frequency band excluding the pass band. For example, the pass band may be about 0.7 Hz to about 7.2 Hz, but embodiments are not limited thereto.

The operational amplifier 380 may receive the third sensing signal SS3 from the noise eliminator 341, may receive the fourth sensing signal SS4 from the band pass filter 370, and may generate a fifth sensing signal SS5 based on the third sensing signal SS3 and the fourth sensing signal SS4. For example, the operational amplifier 380 may generate the fifth sensing signal SS5 by adding the third sensing signal SS3 and the fourth sensing signal SS4. In an embodiment, the fifth sensing signal SS5 may be the PPG signal transferred to the main processor 400, which because of the output of the noise eliminator 341 produces a more accurate indication of the PPG of the user. In another embodiment, the readout circuit 302 may further include various filters (e.g., BPF, or the like) for additionally filtering the fifth sensing signal SS5 (e.g., for additionally removing noise from the fifth sensing signal SS5), and a signal obtained by additionally filtering the fifth sensing signal SS5 may be the PPG signal transferred to the main processor 400.

Figure 12:
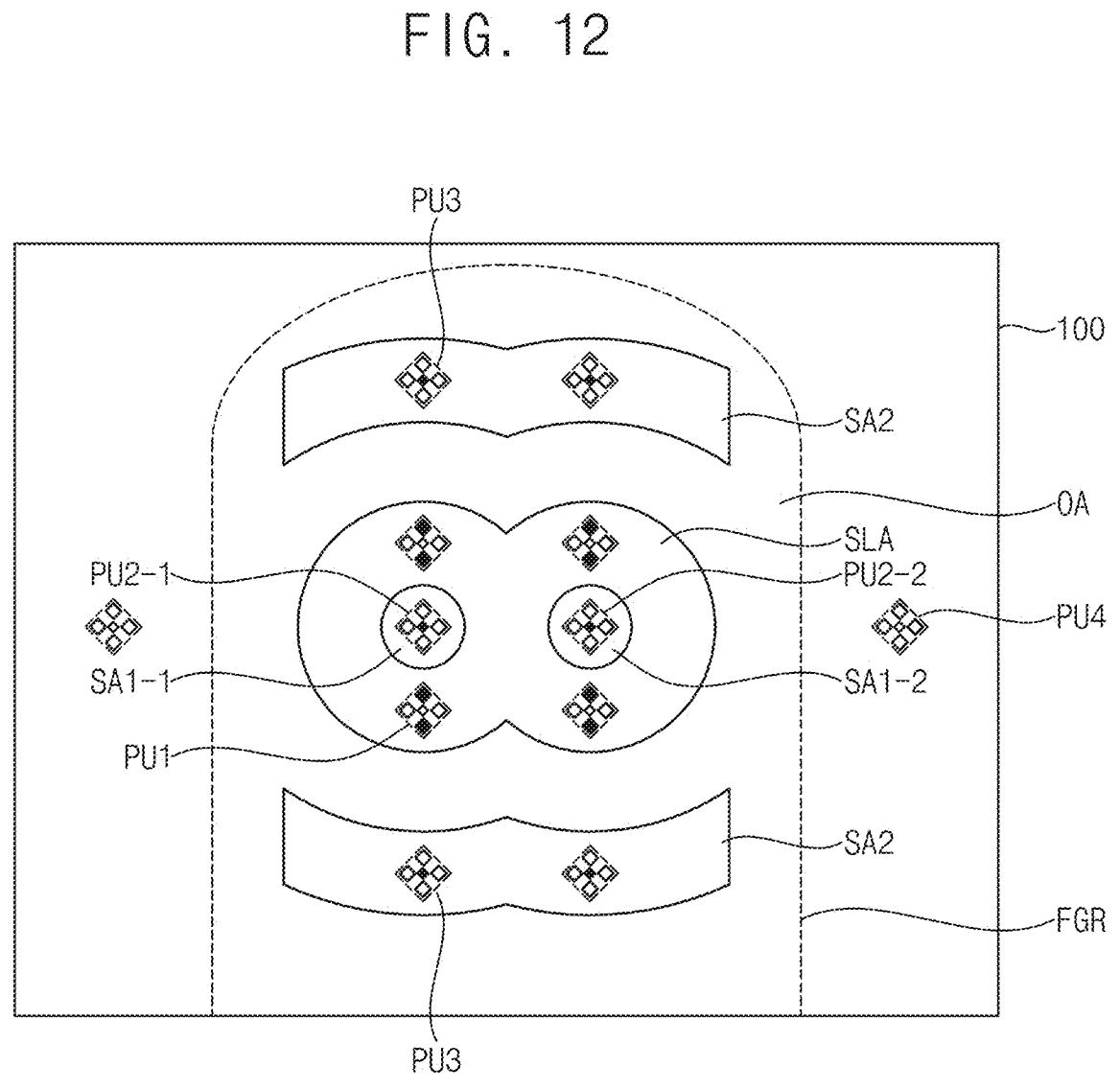
Figure 13:
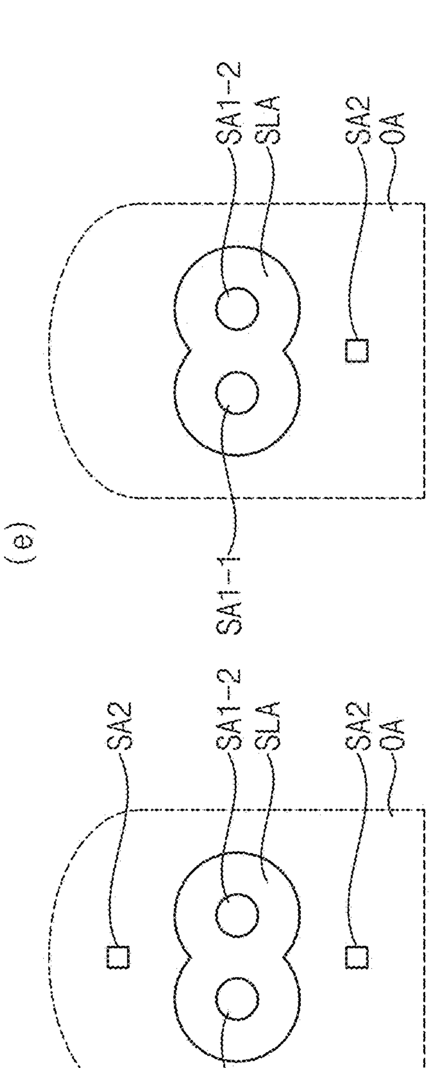
FIG. 13 is a diagram for explaining examples of an arrangement of a sensing area and a sensing light emitting area of the display device of FIG. 12.
Figure 14:
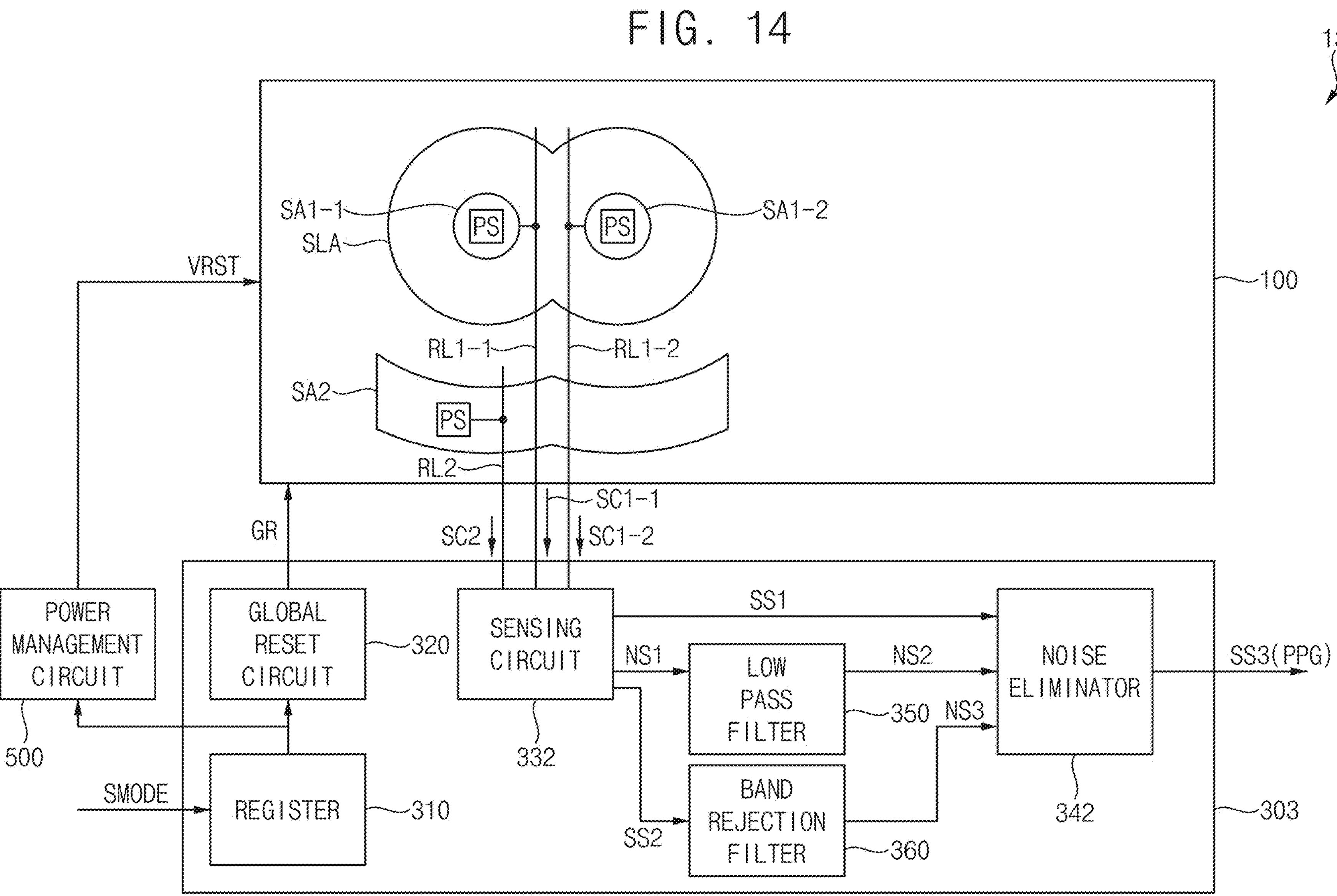
FIG. 14 is a diagram illustrating an example of a readout circuit included in the display device of FIG. 12.

FIG. 12 is a diagram for explaining a sensing operation in a PPG sensing mode of a display device according to another embodiment. FIG. 13 is a diagram for explaining examples of an arrangement of a sensing area and a sensing light emitting area of the display device of FIG. 12. FIG. 14 is a diagram illustrating an example of a readout circuit included in the display device of FIG. 12.

A display device 13 according to another embodiment described with reference to FIGS. 12 to 14 may be substantially the same or similar to the display device 11 described with reference to FIGS. 8 to 10, except that a readout circuit 303 is partially changed and the sensing light emitting area SLA and the sensing area are set differently in the PPG sensing mode. Therefore, repeated descriptions may be omitted or simplified.

Referring to FIGS. 1, 2, 12, 13, and 14, in the PPG sensing mode, the display device 13 may drive the light emitting pixels PX to emit light in a sensing light emitting area SLA, and may drive the light sensing pixels PS to sense light in each of a first-first sensing area SA1-1, a first-second sensing area SA1-2, and a second sensing area SA2 spaced apart from each other.

In an embodiment, the sensing light emitting area SLA, the first-first sensing area SA1-1, the first-second sensing area SA1-2, and the second sensing area SA2 may be set in the display area DA. For example, according to the touch coordinates of the finger FGR of the user, the sensing light emitting area SLA, the first-first sensing area SA1-1, the first-second sensing area SA1-2, and the second sensing area SA2 may be set to each overlap the finger FGR of a user. A remaining area of the display area DA except for the sensing light emitting area SLA, the first-first sensing area SA1-1, the first-second sensing area SA1-2, and the second sensing area SA2 may be an off area OA.

Hereinafter, pixel units PU in the sensing light emitting area SLA may be referred to as first pixel units PU1, pixel units PU in the first-first sensing area SA1-1 may be referred to as second-first pixel units PU2-1, pixel units PU in the first-second sensing area SA1-2 may be referred to as second-second pixel units PU2-2, pixel units PU in the se second sensing area SA2 may be referred to as third pixel units PU3, and pixel units PU in the off area OA may be referred to as fourth pixel units PU4.

In the PPG sensing mode, one or more of the light emitting pixels in the sensing light emitting area SLA may emit light. In the PPG sensing mode, one or more of the light emitting pixels PX in the sensing light emitting area SLA may be turned on, and the light sensing pixels PS in the sensing light emitting area SLA may be turned off.

In the PPG sensing mode, each of the first-first sensing area SA1-1 and the first-second sensing area SA1-2 may sense light reflected from the finger FGR of the user. In the PPG sensing mode, the light emitting pixels PX in each of the first-first sensing area SA1-1 and the first-second sensing area SA1-2 may be turned off, and the light sensing pixels PS in each of the first-first sensing area SA1-1 and the first-second sensing area SA1-2 may be turned on. In the PPG sensing mode, light emitted from the sensing light emitting area SLA may be reflected from the blood vessel of the finger of the user, and the reflected light may be incident in each of the first-first sensing area SA1-1 and the first-second sensing area SA1-2. The light sensing pixels PS in each of the first-first sensing area SA1-1 and the first-second sensing area SA1-2 may sense the reflected light.

In the PPG sensing mode, the second sensing area SA2 may sense light. In the PPG sensing mode, the light emitting pixels PX in the second sensing area SA2 may be turned off, and the light sensing pixels PS in the second sensing area SA2 may be turned on. In the PPG sensing mode, light emitted from the sensing light emitting area SLA may be reflected from the blood vessel BV of the finger FGR of the user, but the reflected light may not be incident in the second sensing area SA2 due to the spacing between the sensing light emitting area SLA and the second sensing area SA2. The light sensing pixels PS in the second sensing area SA2 may sense incident light, which is incident due to various causes (e.g., motion artifact, micro-motion, mis-positioning, ambient light, breathing, or the like), regardless of the reflected light.

In the PPG sensing mode, the light emitting pixels PX and the light sensing pixels PS in the off area OA may both be turned off.

The first-first sensing area SA1-1 and the first-second sensing area SA1-2 may be spaced apart from each other. Each of the first-first sensing area SA1-1 and the first-second sensing area SA1-2 may be adjacent to the sensing light emitting area SLA, so that the reflected light can be incident in each of the first-first sensing area SA1-1 and the first-second sensing area SA1-2. For example, the sensing light emitting area SLA may adjoin (or contact) both the first-first sensing area SA1-1 and the first-second sensing area SA1-2 in a plan view. For example, the sensing light emitting area SLA may surround at least a portion of each of the first-first sensing area SA1-1 and the first-second sensing area SA1-2 in a plan view. For example, as illustrated in FIG. 8, when the first-first sensing area SA1-1 and the first-second sensing area SA1-2 have a circular shapes spaced apart from each other in a plan view, the sensing light emitting area SLA may have a figure eight or 'o' shape surrounding the first-first sensing area SA1-1 and the first-second sensing area SA1-2 in a plan view, but embodiments are not limited thereto. For example, a planar shape of each of the sensing light emitting area SLA, the first-first sensing area SA1-1, and the first-second sensing area SA1-2 may be variously modified, for example, as illustrated in FIGS. 13A to 13C.

The second sensing area SA2 may be spaced apart from the sensing light emitting area SLA so that the reflected light cannot fall incident in the second sensing area SA2. The second sensing area SA2 may be set to have various positions, various sizes, and various shapes such that the second sensing area SA2 is in an area overlapping the finger FGR, but due to the spacing between the sensing light emitting area SLA and the second sensing area SA2, the reflected light does not fall incident in the second sensing area SA2.

In an embodiment, as illustrated in FIG. 12, a plurality of second sensing areas SA2 may be provided, and the plurality of second sensing areas SA2 may be positioned at different or opposing sides of the sensing light emitting area SLA. In addition, the size of each of the second sensing areas SA2 may be greater than the size of the first-first sensing area SA1-1 and/or the size of the first-second sensing area SA1-2, but embodiments are not limited thereto. For example, as illustrated in FIG. 13D, the size of each of the second sensing areas SA2 may be less than the size of the first-first sensing area SA1-1 or the size of the first-second sensing area SA1-2. In addition, as illustrated in FIG. 13E, one second sensing area SA2 may be provided, and the second sensing area SA2 may be positioned at one side of the sensing light emitting area SLA.

In an embodiment, the readout circuit 303 may include a register 310, a global reset circuit 320, a sensing circuit 332, a noise eliminator 342, a low pass filter 350, and a band rejection filter 360. The register 310 and the global reset circuit 320 of the readout circuit 303 may be substantially the same or similar to the register 310 and the global reset circuit 320 of the readout circuit 300 described with reference to FIG. 7.

The sensing circuit 332 may receive sensing current SC1-1 of one or more of the light sensing pixels PS in the first-first sensing area SA1-1 through first-first readout lines RL1-1, and may generate a first sensing signal SS1 corresponding to the sensing current SC1-1. The sensing circuit 332 may receive sensing currents SC1-2 of one or more of the light sensing pixels PS in the first-second sensing area SA1-2 through first-second readout lines RL1-2, and may generate a second sensing signal SS2 corresponding to the sensing currents SC1-2. The sensing circuit 332 may receive sensing current SC2 of the one or more light sensing pixels PS in the second sensing area SA2 through second readout lines RL2, and may generate a first noise signal NS1 corresponding to the sensing currents SC2. Each of the first sensing signal SS1 and the second sensing signal SS2 may include not only data of the volume of the blood vessel BV over time, which is obtained by sensing the reflected light, but also a noise component. The first noise signal NS1 may include noise due to by the various causes regardless of or not the result of the reflected light.

The low pass filter 350 may receive the first noise signal NS1 from the sensing circuit 332, and may generate a second noise signal NS2 from the first noise signal NS1 by blocking frequency components of a cut-off frequency or greater and passing only low frequency components less than the cut-off frequency. For example, the cut-off frequency may be about 0.5 Hz, but embodiments are not limited thereto.

The band rejection filter 360 may receive the second sensing signal SS2 from the sensing circuit 332, and may generate a third noise signal NS3 from the second sensing signal SS2 by blocking frequency components in a stop band and passing only frequency components in a remaining frequency band excluding the stop band. For example, the stop band may be about 0.7 Hz to about 7.2 Hz, but embodiments are not limited thereto.

The noise eliminator 342 may receive the first sensing signal SS1 from the sensing circuit 332, may receive the second noise signal NS2 from the low pass filter 350, may receive the third noise signal NS3 from the band rejection filter 360, and may generate a third sensing signal SS3 based on the first sensing signal SS1, the second noise signal NS2, and the third noise signal NS3. For example, the noise eliminator 342 may generate the third sensing signal SS3 by subtracting the second noise signal NS2 and the third noise signal NS3 from the first sensing signal SS1. In an embodiment, the third sensing signal SS3 may be the PPG signal transferred to the main processor 400. In another embodiment, the readout circuit 303 may include various filters (e.g., BPF, or the like) for additionally filtering the third sensing signal SS3 (e.g., for additionally removing noise from the third sensing signal SS3), and a signal obtained by additionally filtering the third sensing signal SS3 may be the PPG signal transferred to the main processor 400.

Figure 15:
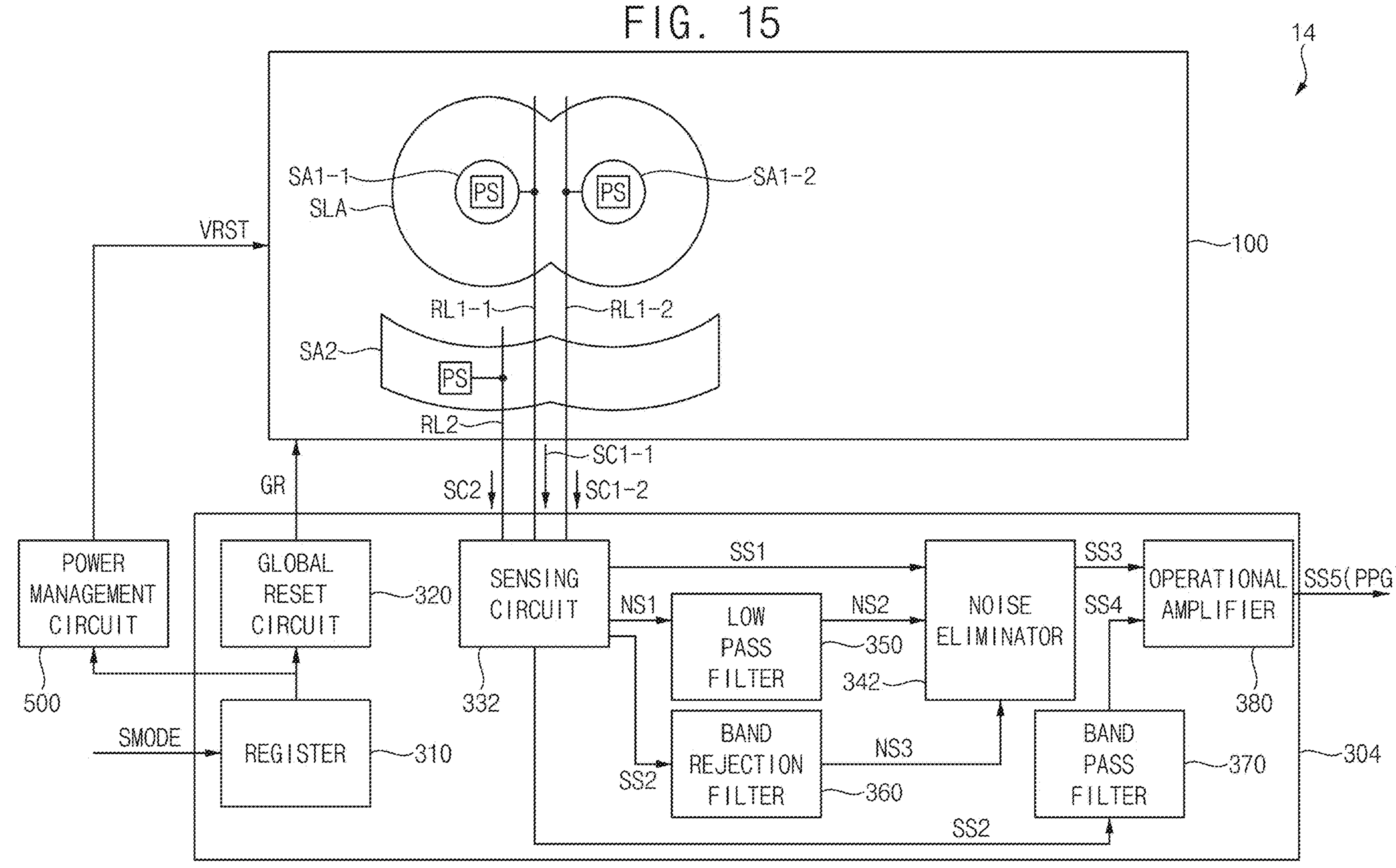
FIG. 15 is a diagram illustrating another example of the readout circuit included in the display device of FIG. 12.

FIG. 15 is a diagram illustrating another example of the readout circuit included in the display device of FIG. 12. A display device 14 according to another embodiment described with reference to FIG. 15 may be substantially the same or similar to the display device 13 described with reference to FIG. 14, except that a readout circuit 304 is partially changed. Therefore, repeated descriptions may be omitted or simplified.

Referring to FIG. 15, in an embodiment, the readout circuit 304 may include a register 310, a global reset circuit 320, a sensing circuit 332, a noise eliminator 342, a low pass filter 350, a band rejection filter 360, a band pass filter 370, and an operational amplifier 380. The sensing circuit 332, the noise eliminator 342, the low pass filter 350, and the band rejection filter 360 of the readout circuit 304 may be substantially the same or similar to the sensing circuit 332, the noise eliminator 342, and the band rejection filter 360 of the readout circuit 303 described with reference to FIG. 14.

The band pass filter 370 may receive the second sensing signal SS2 from the sensing circuit 332, and may generate a fourth sensing signal SS4 from the second sensing signal SS2 by only passing frequency components in a pass band and blocking frequency components in a remaining frequency band excluding the pass band. For example, the pass band may be about 0.7 Hz to about 7.2 Hz, but embodiments are not limited thereto.

The operational amplifier 380 may receive the third sensing signal SS3 from the noise eliminator 342, may receive the fourth sensing signal SS4 from the band pass filter 370, and may generate a fifth sensing signal SS5 based on the third sensing signal SS3 and the fourth sensing signal SS4. For example, the operational amplifier 380 may generate the fifth sensing signal SS5 by adding the third sensing signal SS3 and the fourth sensing signal SS4. In an embodiment, the fifth sensing signal SS5 may be the PPG signal transferred to the main processor 400 which has increased accuracy as a result of the outputs of the noise eliminator 342 and the band pass filter 370. In another embodiment, the readout circuit 304 may further include various filters (e.g., BPF, or the like) for additionally filtering the fifth sensing signal SS5 (e.g., for additionally removing noise from the fifth sensing signal SS5), and a signal obtained by additionally filtering the fifth sensing signal SS5 may be the PPG signal transferred to the main processor 400.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, circuits, eliminators, filters, amplifiers, and other signal generating and signal processing features of the embodiments disclosed herein may be implemented, for example, in non-transitory logic that may include hardware, software, or both. When implemented at least partially in hardware, the controllers, processors, circuits, eliminators, filters, amplifiers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

Figure 16:
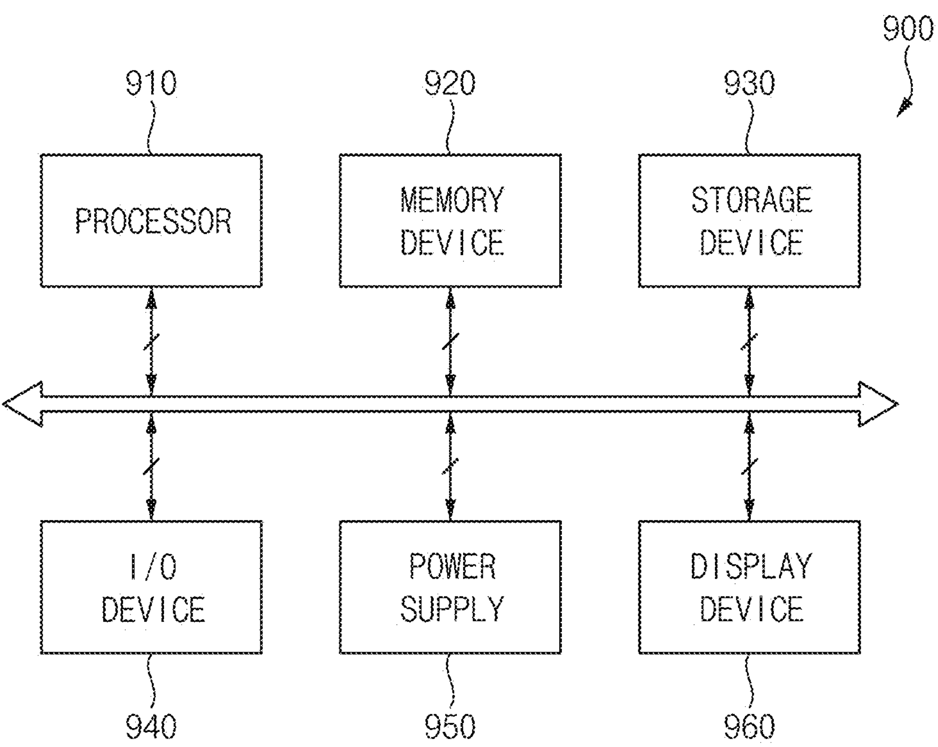
FIG. 16 is a block diagram illustrating an electronic device according to an embodiment.

FIG. 16 is a block diagram illustrating an electronic device according to an embodiment.

Referring to FIG. 16, in an embodiment, an electronic device 900 may include a processor 910, a memory device 920, a storage device 930, an input/output ("I/O") device 940, a power supply 950, and a display device 960. Here, the display device 960 may correspond to the display device 10 of FIGS. 1 and 7, the display device 11 of FIG. 10, the display device 12 of FIG. 11, the display device 13 of FIG. 14, or the display device 14 of FIG. 15. The electronic device 900 may further include a plurality of ports for communicating with a video card, a sound card, a memory card, a universal serial bus ("USB") device, or the like. In an embodiment, the electronic device 900 may be implemented as a television. In another embodiment, the electronic device 900 may be implemented as a smart phone. However, embodiments are not limited thereto, in another embodiment, the electronic device 900 may be implemented as a cellular phone, a video phone, a smart pad, a smart watch, a tablet personal computer ("PC"), a car navigation system, a computer monitor, a laptop, a head disposed (e.g., mounted) display ("HMD"), or the like.

The processor 910 may perform various computing functions. In an embodiment, the processor 910 may be a microprocessor, a central processing unit ("CPU"), an application processor ("AP"), or the like. The processor 910 may be coupled to other components via an address bus, a control bus, a data bus, or the like. In an embodiment, the processor 910 may be coupled to an extended bus such as a peripheral component interconnection ("PCI") bus.

The memory device 920 may store data for operations of the electronic device 900. In an embodiment, the memory device 920 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like, and/or at least one volatile memory device such as a dynamic random access memory ("DRAM") device, a static random access memory ("SRAM") device, a mobile DRAM device, or the like.

In an embodiment, the storage device 930 may include a solid state drive ("SSD") device, a hard disk drive ("HDD") device, a CD-ROM device, or the like. In an embodiment, the I/O device 940 may include an input device such as a keyboard, a keypad, a mouse device, a touchpad, a touch-screen, or the like, and an output device such as a printer, a speaker, or the like.

The power supply 950 may provide power for operations of the electronic device 900. The power supply 950 may provide power to the display device 960. The display device 960 may be coupled to other components via the buses or other communication links. In an embodiment, the display device 960 may be included in the I/O device 940.

When implemented in at least partially in software, the controllers, processors, circuits, eliminators, filters, amplifiers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although embodiments and implementations have been described herein, other embodiments and modifications will be apparent from this description. Accordingly, the invention is not limited to such embodiments, but rather to the broader scope of the appended claims and various obvious modifications and equivalent arrangements as would be apparent to a person of ordinary skill in the art. The embodiments may be combined to form additional embodiments.

What is claimed is:

1. A display device comprising:

a display panel including light emitting pixels and light sensing pixels, each of the light emitting pixels including a light emitting element and each of the light sensing pixels including a photoelectric conversion element; and a readout circuit connected to the light sensing pixels through readout lines, wherein, in a photoplethysmography (PPG) sensing mode, the readout circuit is configured to receive first sensing current from one or more of the light sensing pixels in a first sensing area adjacent to a sensing light emitting area that is configured to emit light, receive second sensing current from one or more of the light sensing pixels in at least one second sensing area spaced from the first sensing area, and generate a PPG signal based on the first sensing current and the second sensing current, wherein, in the PPG sensing mode, the first sensing area includes light emitting pixels that are configured to be turned off and light sensing pixels that are configured to be turned on, wherein, in the PPG sensing mode, the at least one second sensing area includes light emitting pixels that are configured to be turned off and light sensing pixels that are configured to be turned on.

2. The display device of claim 1, wherein the at least one second sensing area is spaced apart from the sensing light emitting area, reflected light, which is emitted from the sensing light emitting area and reflected from a blood vessel of a finger of a user, is incident on the first sensing area, and the reflected light is not incident on the at least one second sensing area.

3. The display device of claim 2, wherein the at least one second sensing area is positioned at one side of the sensing light emitting area.

4. The display device of claim 2, wherein the display device includes a plurality of second sensing areas, and the plurality of second sensing areas are positioned at different sides of the sensing light emitting area.

5. The display device of claim 2, wherein a size of the second sensing area is greater than a size of the first sensing area.

6. The display device of claim 2, wherein the sensing light emitting area surrounds at least a portion of the first sensing area in a plan view.

7. The display device of claim 2, wherein a distance between the sensing light emitting area and the second sensing area is greater than or equal to a width of the sensing light emitting area.

8. The display device of claim 2, wherein the readout circuit includes:

a sensing circuit configured to receive the first sensing current and the second sensing current through the readout lines, generating a first sensing signal corresponding to the first sensing current, and generating a first noise signal corresponding to the second sensing current;

a low pass filter configured to receive the first noise signal from the sensing circuit and generate a second noise signal; and a noise eliminator configured to receive the first sensing signal from the sensing circuit, receive the second noise signal from the low pass filter, and generate a second sensing signal based on the first sensing signal and the second noise signal.

9. The display device of claim 2, wherein the first sensing area includes a first-first sensing area and a first-second sensing area spaced apart from each other, and the reflected light is incident on each of the first-first sensing area and the first-second sensing area, and the readout circuit is configured to receive first-first sensing current from one or more light sensing pixels in the first-first sensing area, receive first-second sensing current from one or more light sensing pixels in the first-second sensing area, and generate the PPG signal based on the first-first sensing current, the first-second sensing current, and the second sensing current.

10. The display device of claim 9, wherein the readout circuit includes:

a sensing circuit configured to receive the first-first sensing current, the first-second sensing current, and the second sensing current through the readout lines, generate a first sensing signal corresponding to the first-first sensing current, generate a second sensing signal corresponding to the first-second sensing current, and generate a first noise signal corresponding to the second sensing current;

a low pass filter configured to receive the first noise signal from the sensing circuit and generating a second noise signal;

a band rejection filter configured to receive the second sensing signal from the sensing circuit and generating a third noise signal; and a noise eliminator configured to receive the first sensing signal from the sensing circuit, receive the second noise signal from the low pass filter, receive the third noise signal from the band rejection filter, and generate a third sensing signal based on the first sensing signal, the second noise signal, and the third noise signal.

11. The display device of claim 10, wherein the readout circuit further includes:

a band pass filter configured to receive the second sensing signal from the sensing circuit and generating a fourth sensing signal; and an operational amplifier configured to receive the third sensing signal from the noise eliminator, receive the fourth sensing signal from the band pass filter, and generate a fifth sensing signal based on the third sensing signal and the fourth sensing signal.

12. The display device of claim 1, wherein the second sensing area is adjacent to the sensing light emitting area, and reflected light, which is emitted from the sensing light emitting area and reflected from a blood vessel of a finger of a user, is incident on each of the first sensing area and the second sensing area.

13. The display device of claim 12, wherein the readout circuit includes:

a sensing circuit configured to receive the first sensing current and the second sensing current through the readout lines, generate a first sensing signal corresponding to the first sensing current, and generate a first noise signal corresponding to the second sensing current;

a band rejection filter configured to receive the second sensing signal from the sensing circuit and generating a noise signal; and a noise eliminator configured to receive the first sensing signal from the sensing circuit, receive the noise signal from the band rejection filter, and generate a third sensing signal based on the first sensing signal and the noise signal.

14. The display device of claim 13, wherein the readout circuit includes:

a band pass filter configured to receive the second sensing signal from the sensing circuit and generating a fourth sensing signal; and an operational amplifier configured to receive the third sensing signal from the noise eliminator, receive the fourth sensing signal from the band pass filter, and generate a fifth sensing signal based on the third sensing signal and the fourth sensing signal.

15. The display device of claim 1, wherein in the PPG sensing mode, the sensing light emitting area includes light emitting pixels that are turned on and light sensing pixels that are turned off.

16. The display device of claim 15, wherein the light emitting pixels and the light sensing pixels are disposed in an entire display area of the display panel, the display area includes the sensing light emitting area, the first sensing area, the second sensing area, and an off area, and in the PPG sensing mode, the light emitting pixels and the light sensing pixels in the off area are turned off.

17. The display device of claim 1, wherein each of the light emitting pixels includes:

a first transistor configured to generate a driving current;

a second transistor configured to transfer a data signal in response to a write signal;

a third transistor configured to diode-connect the first transistor in response to a compensation signal;

a fourth transistor configured to transfer an initialization voltage to a gate of the first transistor in response to an initialization signal;

a fifth transistor configured to connect a line of a first power supply voltage and the first transistor in response to an emission signal;

a sixth transistor configured to connect the first transistor and the light emitting element in response to the emission signal;

a seventh transistor configured to transfer an anode initialization voltage to the light emitting element in response to a bypass signal;

an eighth transistor configured to transfer a bias voltage to a terminal of the first transistor in response to the bypass signal;

a storage capacitor connected between the line of the first power supply voltage and the gate of the first transistor; and the light emitting element emitting light based on the driving current.

18. The display device of claim 17, wherein each of the light sensing pixels includes:

a ninth transistor configured to generate a sensing current based on a voltage of an anode of the photoelectric conversion element;

a tenth transistor configured to transfer a reset voltage to the anode of the photoelectric conversion element in response to a global reset signal;

an eleventh transistor configured to connect the ninth transistor and the readout line in response to the write signal; and the photoelectric conversion element.

19. The display device of claim 1, further comprising:

a main processor configured to receive the PPG signal from the readout circuit and determine a biomarker of a user based on the PPG signal.

20. A display device comprising:

a display panel including light emitting pixels and light sensing pixels, each of the light emitting pixels including a light emitting element and each of the light sensing pixels including a photoelectric conversion element; and a readout circuit connected to the light sensing pixels through readout lines and configured to generate a photoplethysmography (PPG) signal based on sensing currents received from the light sensing pixels in a PPG sensing mode, and wherein in the PPG sensing mode, one or more of the light emitting pixels in a sensing light emitting area are turned on, one or more of the light sensing pixels in the sensing light emitting area are turned off, and reflected light, which is emitted from the sensing light emitting area and reflected from a blood vessel of a finger of a user, is incident on a partial area of the display panel, in a first sensing area where the reflected light is incident, one or more of the light emitting pixels are turned off and one or more of the light sensing pixels are turned on, and in a second sensing area where the reflected light is not incident, one or more of the light emitting pixels are turned off and one or more of the light sensing pixels are turned on.

21. A display device comprising:

a first pixel to emit light reflected by a finger of a user;

a light sensing pixel at a position to sense the reflected light;

a second pixel at a position that does not sense the reflected light;

a sensing circuit to generate a first sensing signal based on a sensing current output from the light sensing pixel and to generate a noise signal based on a sensing current output from the second pixel, and a noise eliminator to subtract the noise signal from the first sensing signal to generate a biological signal of the user, wherein the finger overlaps the first pixel and the second pixel and the light sensing pixel.

22. The display device of claim 21, wherein the biological signal is a photoplethysmography (PPG) signal.

23. The display device of claim 21, wherein the first pixel is configured to emit green light.

24. The display device of claim 21, wherein the sensing current output from the second pixel is generated based on one of a motion artifact, micro-motion, mis-positioning, ambient light, or breathing of the user.

25. An electronic device comprising:

a display device; and a power supply configured to provide power to the display device, wherein the display device comprises:

a display panel including light emitting pixels and light sensing pixels, each of the light emitting pixels including a light emitting element and each of the light sensing pixels including a photoelectric conversion element; and a readout circuit connected to the light sensing pixels through readout lines, wherein, in a photoplethysmography (PPG) sensing mode, the readout circuit is configured to receive first sensing current from one or more of the light sensing pixels in a first sensing area adjacent to a sensing light emitting area that is configured to emit light, receive second sensing current from one or more of the light sensing pixels in at least one second sensing area spaced from the first sensing area, and generate a PPG signal based on the first sensing current and the second sensing current, wherein, in the PPG sensing mode, the first sensing area includes light emitting pixels that are configured to be turned off and light sensing pixels that are configured to be turned on, wherein, in the PPG sensing mode, the at least one second sensing area includes light emitting pixels that are configured to be turned off and light sensing pixels that are configured to be turned on.

26. The electronic device of claim 25, wherein in the PPG sensing mode, the sensing light emitting area includes light emitting pixels that are turned on and light sensing pixels that are turned off.

* * * * *